(12) United States Patent  
Furukawa et al.

(10) Patent No.: US 8,786,652 B2  
(45) Date of Patent: Jul. 22, 2014

(54) INFORMATION PROCESSING APPARATUS, INFORMATION PROCESSING METHOD, AND SYSTEM

(71) Applicants: Takahiro Furukawa, Shizuoka (JP); Daisuke Tezuka, Tokyo (JP)

(72) Inventors: Takahiro Furukawa, Shizuoka (JP); Daisuke Tezuka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/738,275

(22) Filed: Jan. 10, 2013

(65) Prior Publication Data

US 2013/0182060 A1 Jul. 18, 2013

(30) Foreign Application Priority Data

Jan. 17, 2012 (JP) ................................ 2012-007488  
Nov. 21, 2012 (JP) ................................ 2012-255472

(51) Int. Cl.
*B41J 2/435* (2006.01)  
*B41J 2/47* (2006.01)

(52) U.S. Cl.  
USPC ........................... 347/234; 347/229; 347/248

(58) Field of Classification Search  
USPC .......... 347/229, 234, 235, 248–250; 358/448, 358/451  
See application file for complete search history.

(56) References Cited

U.S. PATENT DOCUMENTS

| 4,591,904 A * | 5/1986 | Urabe et al. .................. 358/537 |
| 2011/0096040 A1 | 4/2011 | Hasegawa |
| 2012/0162340 A1 | 6/2012 | Furukawa et al. |

FOREIGN PATENT DOCUMENTS

| JP | 61-052737 | 3/1986 |
| JP | 2004-090026 | 3/2004 |
| JP | 2008-097450 | 4/2008 |
| JP | 2011-116114 | 6/2011 |

\* cited by examiner

*Primary Examiner* — Hai C Pham  
(74) *Attorney, Agent, or Firm* — Harness, Dickey & Pierce, P.L.C.

(57) ABSTRACT

An information processing apparatus that generates positional information relating to an energy transmitting position includes a shape information obtaining unit that obtains shape information of a region, a circumscribed rectangle generating unit that generates a circumscribed rectangle of the region, a parallel line generating unit that generates parallel lines extending across the region at a predetermined interval, an intersection calculating unit that calculates a first intersection point between a parallel line of the parallel lines and a line segment of an outline defining the region that is generated based on the shape information, and a data generating unit that generates parallel line data by dividing the parallel line at the first intersection point and removing a divided line that overlaps with the circumscribed rectangle, or by shortening an edge point of the parallel line to the first intersection point.

11 Claims, 31 Drawing Sheets

Background Art

Background Art
FIG.3B

| | | | | | |
|---|---|---|---|---|---|
| [0] | 1 | 20 | 70 | 70 | 70 |
| [1] | 1 | 70 | 70 | 70 | 20 |
| [2] | 1 | 70 | 20 | 20 | 20 |
| [3] | 1 | 20 | 20 | 20 | 70 |
| [4] | 0 | 20 | 70 | 45 | 60 |
| [5] | 1 | 45 | 60 | 60 | 60 |
| [6] | 0 | 60 | 60 | 52 | 57 |
| [7] | 1 | 52 | 57 | 52 | 30 |
| [8] | 0 | 52 | 30 | 100 | 0 |

← Ep

↑ In  ↑ W  ↑ Sp

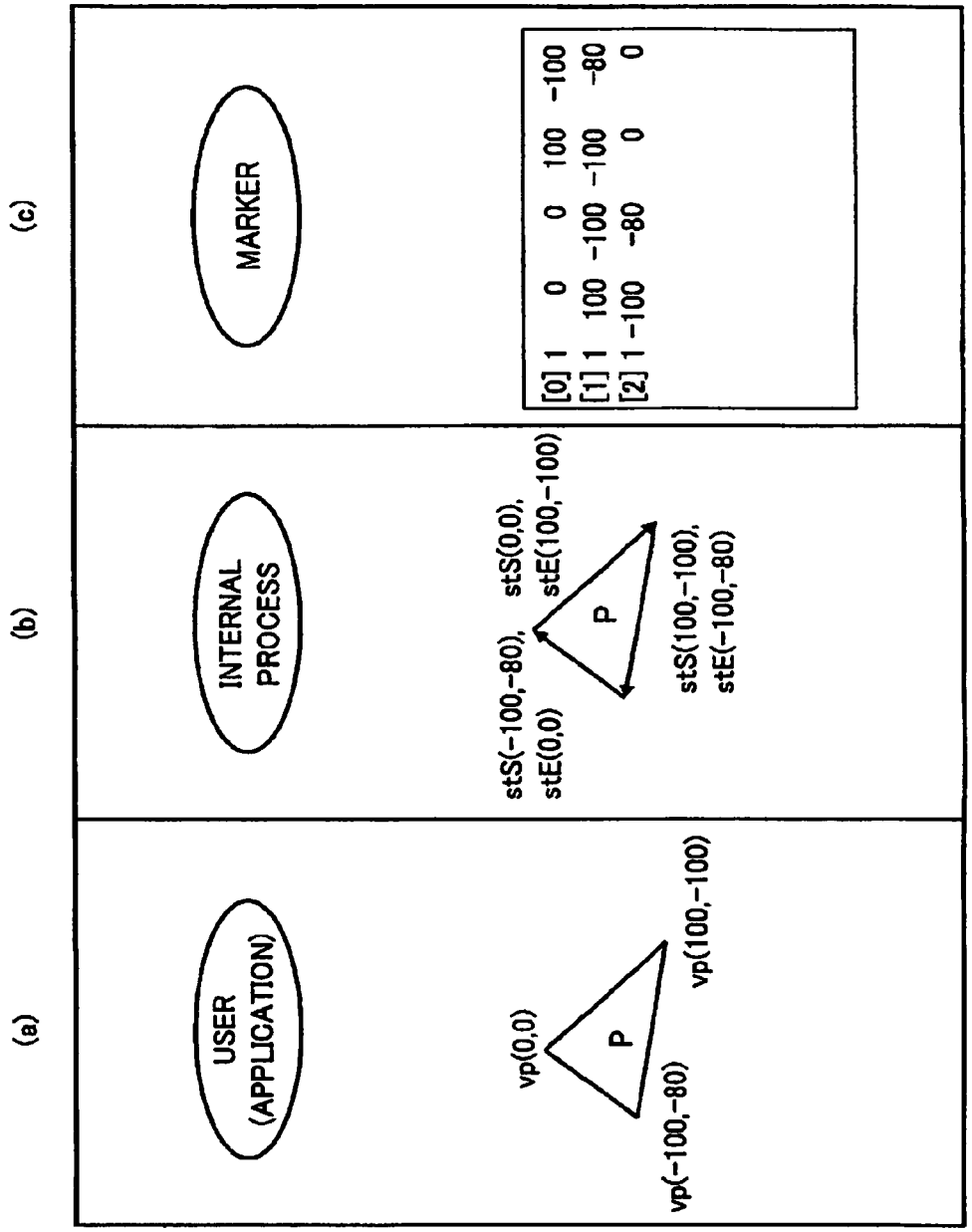

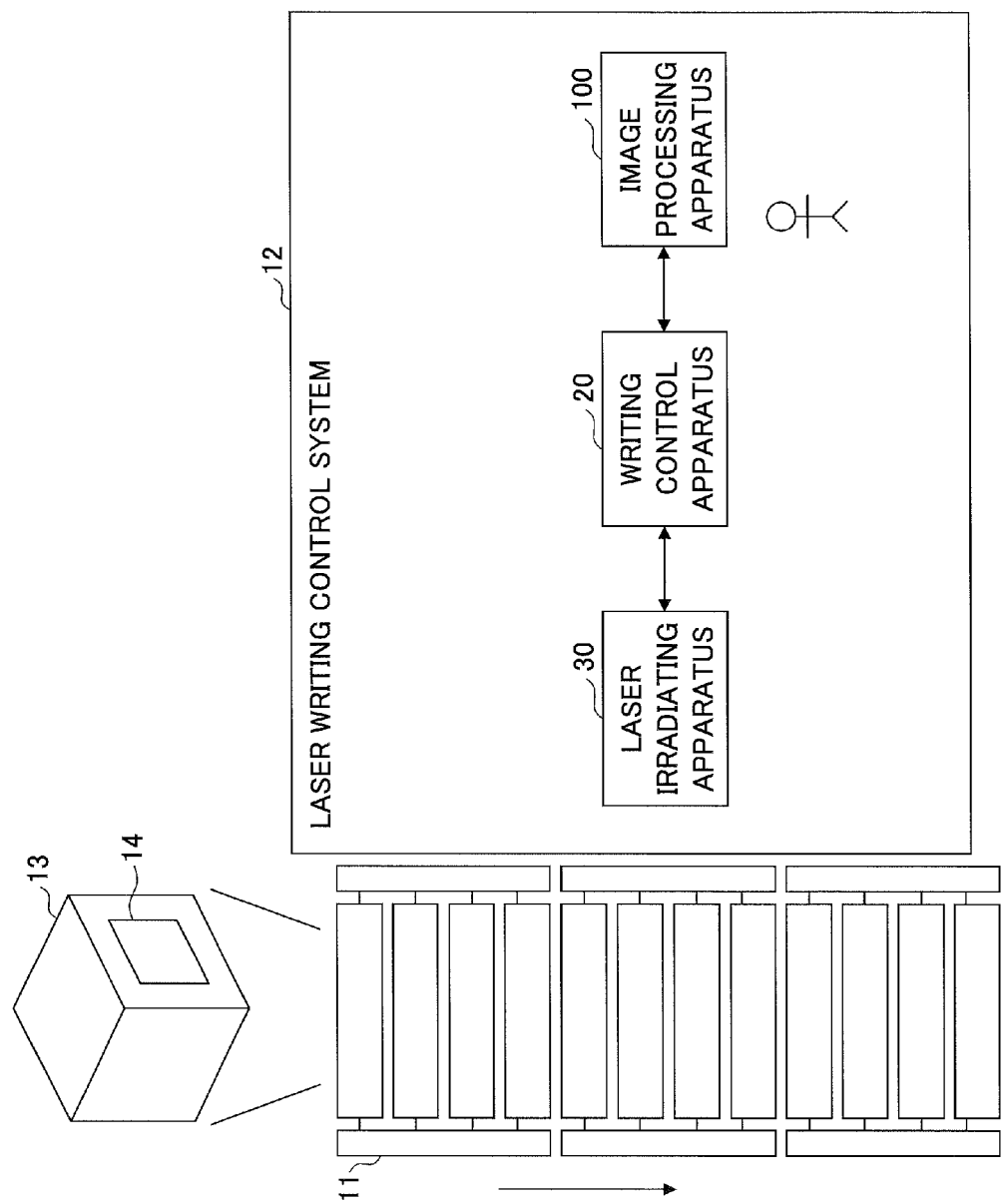

INTERSECTION POINTS

DIVISION

CIRCUM-SCRIBED RECTANGLE

REMOVAL

PROVISIONAL VECTOR DATA

FILLING DATA

INTERSECTION POINTS

REMOVAL

CIRCUM-
SCRIBED
RECTANGLE

FILLING DATA

PROVISIONAL
VECTOR DATA

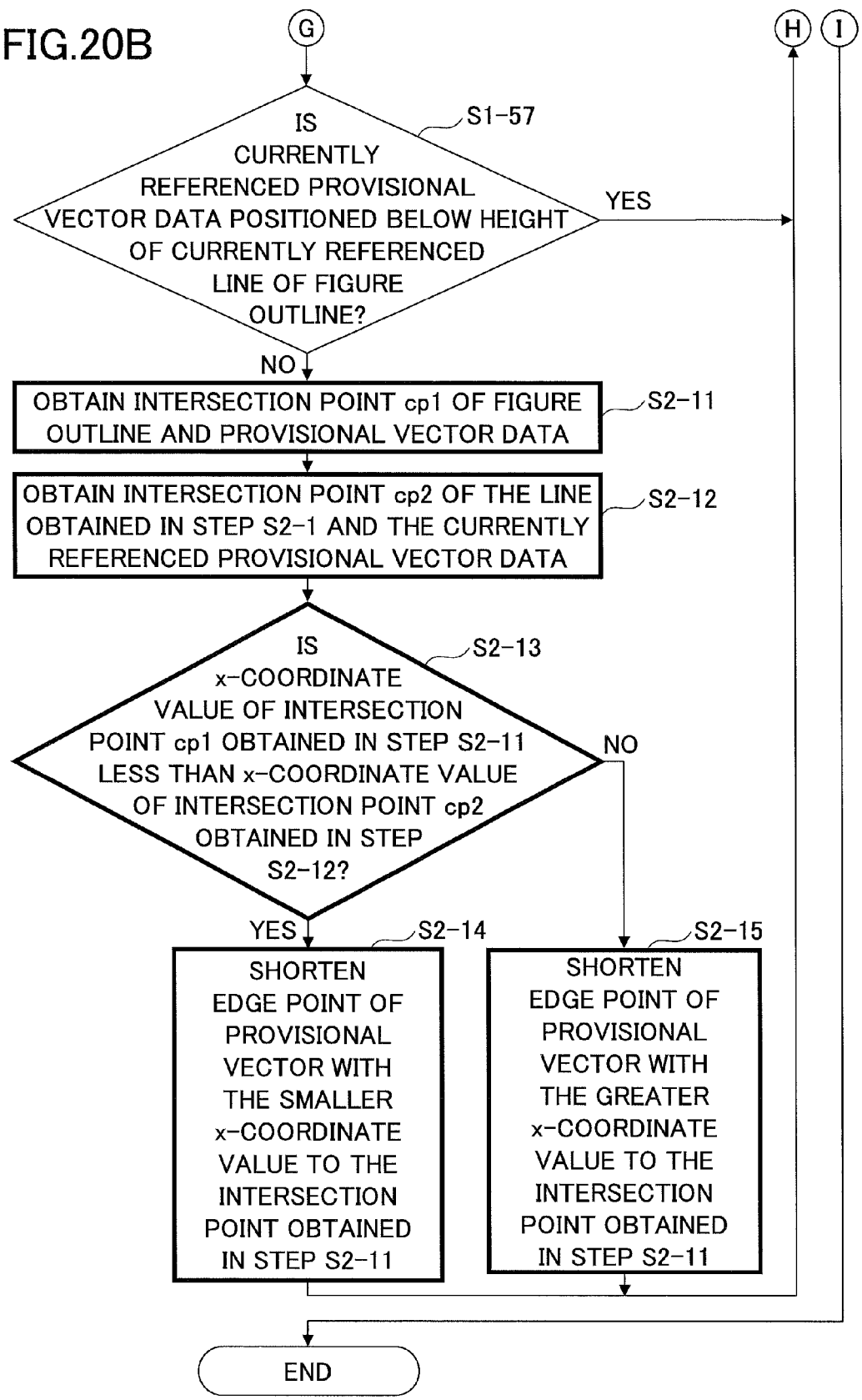

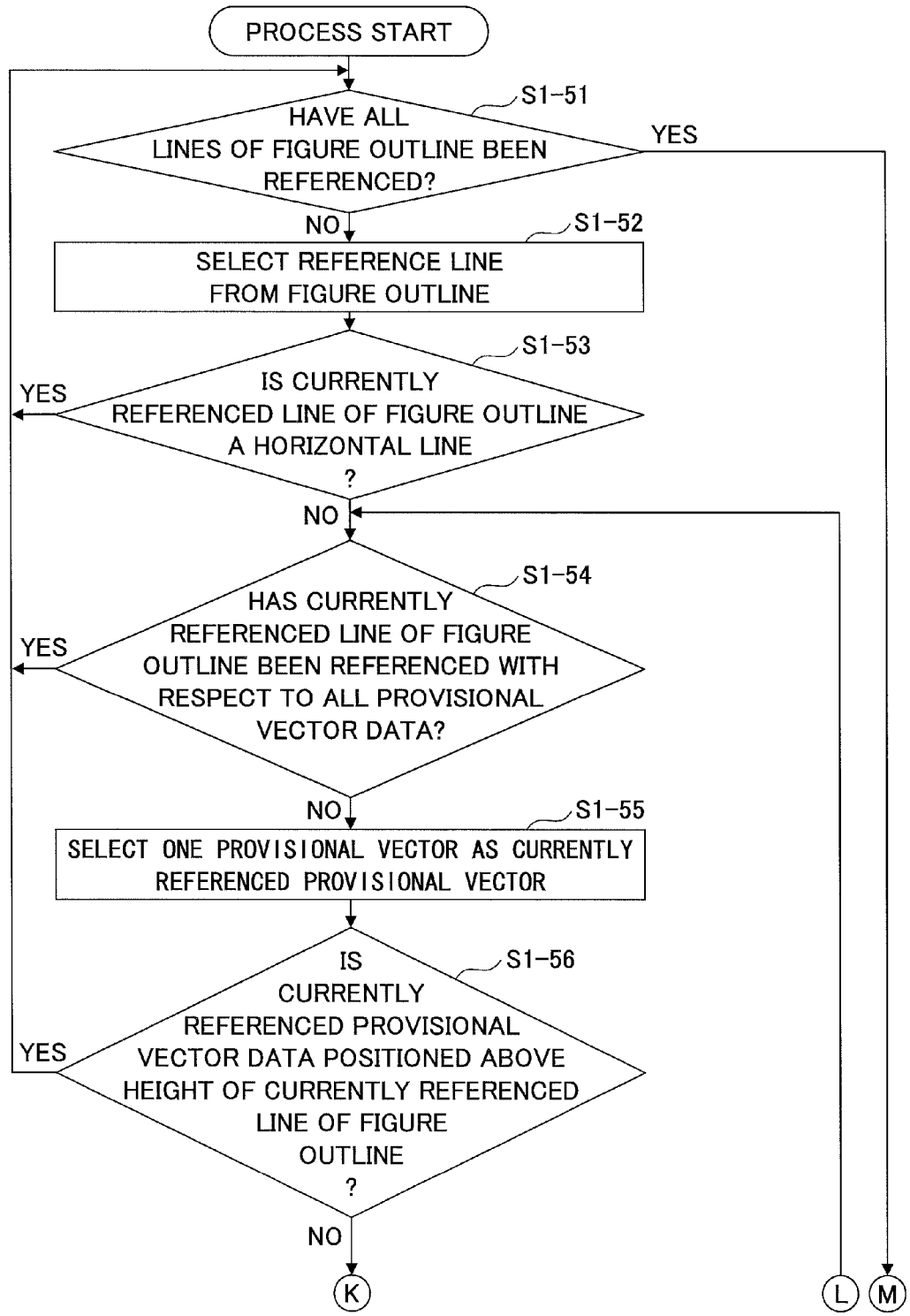

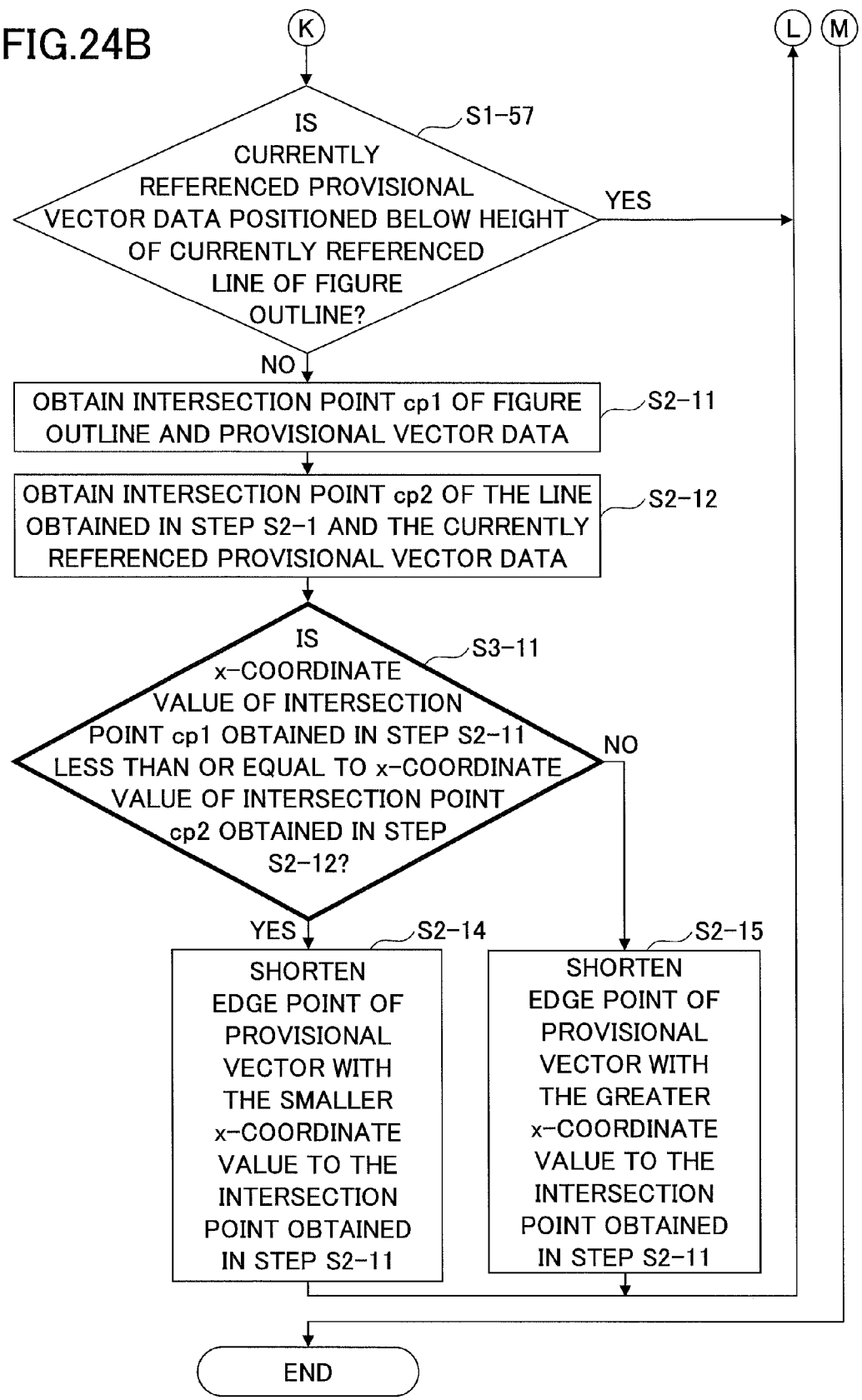

INFORMATION PROCESSING APPARATUS, INFORMATION PROCESSING METHOD, AND SYSTEM

BACKGROUND OF THE INVENTION

1. Field of the Invention

The present invention relates generally to an information processing apparatus, an information processing method, and a system, and particularly to an information processing apparatus that provides control data for forming visual information to an apparatus that forms visual information on a recording medium by irradiating laser light.

2. Description of the Related Art

Technology for writing characters and symbols on a sheet medium such as paper using laser are practically applied in various fields. Such technology for writing characters on a sheet medium may facilitate drawing characters on container labels used at factories and other sites, for example. In the context of applying this technology to container labels, for example, the destination of goods and/or the name of goods may be printed on the container labels implementing this technology to reduce manual or mechanical labor for replacing the container labels (see, e.g., Japanese Laid-Open Patent Publication No. 2004-90026). Japanese Laid-Open Patent Publication No. 2004-90026 discloses a relay lens system that transmits an image using a laser beam entered from one end to the other end of plural lens systems made of plural flexible joints.

Also, practical applications are developing for rewritable thermal paper that can have objects drawn and erased multiple times. For example, in the context of applying this technology to containers used in product distribution, since the destination of a container is not necessarily the same each time it is dispatched, the above technology may be used to erase characters drawn on a label so that new characters can be drawn on the same label. In this way, the need to replace the label may be reduced.

FIG. 1 shows an exemplary label having characters and other objects drawn thereon. The label has plural objects such as numbers, characters, figures, and a barcode drawn thereon. When drawing characters, laser is condensed by a lens into a focused beam so that even intricate characters may be drawn. When drawing characters and other objects using laser, the laser irradiating position is controlled so that strokes (lines) of a character are drawn by the laser beam.

FIGS. 2A and 2B illustrate an example in which the letter T is drawn on thermal paper. FIG. 2A shows an exemplary printout of the letter T output by a printing apparatus. The letter T is made up of two strokes, one lateral line and one vertical line. In the case of drawing this letter T using laser, laser irradiation is controlled to draw the above two strokes.

FIG. 2B shows exemplary pairs of starting points and end points, (s1, e1) and (s2, e2), of the two strokes making up the letter T. A writing control apparatus for controlling the laser irradiating position may move the laser irradiating position to the starting point s1 without irradiating any laser by adjusting the position of the laser beam using a galvano mirror, for example. Then, the writing control apparatus may start laser irradiation (may simply be referred to as "laser ON" hereinafter) and move the beam from the starting point s1 to the end point e1.

Then, the writing control apparatus may stop the laser irradiation (may simply be referred to as "laser OFF" hereinafter) and move the laser irradiating position to the starting point s2 without irradiating any laser. Then, the writing control apparatus may start laser irradiation and move the laser beam from the starting point s2 to the end point e2. In this way, the two strokes making up the letter T may be drawn on the thermal paper. That is, visual information may be formed by transmitting laser energy to the thermal paper while continuously changing the transmitting position of the laser.

When drawing characters and other objects on thermal paper as described above, the writing control apparatus may control laser irradiating operations of a drawing apparatus such as a laser irradiating apparatus using a control command (drawing command) directing "laser ON from starting point to end point and move laser beam," for example.

FIG. 3A shows an exemplary drawing object including a character and a figure. FIG. 3B shows an exemplary control command used by the writing control apparatus. It is noted that the references ln, W, Sp, and Ep in the control command shown in FIG. 3B represent the following:

ln: line number (stroke number)

W: laser ON/OFF (where "1" denotes ON and "0" denotes OFF)

Sp: starting point coordinates

Ep: end point coordinates.

It is noted that the coordinates are represented as (X, Y) where X designates a position in the horizontal direction and Y designates a position in the vertical direction. The coordinate value of X increases as the position moves rightward. The coordinate value of Y increases as the position moves upward. It is noted that the above manner of defining a coordinate point is merely an illustrative example and other methods may be used as well.

In drawing an object such as a character or a figure (also referred to as "drawing object" hereinafter) on thermal paper, a control command for controlling the laser beam has to be generated based on the drawing object. Also, additional processes such as rotating a character from its original position, removing overlapping portions between lines, and setting up other items of information must be contemplated as well. In this regard, drawing object data that is to be converted into a beam control command is preferably in vector data format.

FIG. 4 is a diagram illustrating exemplary drawing object data for drawing a triangle on thermal paper. In the following descriptions, an apparatus that generates vector data and/or a scanning command is referred to as "image processing apparatus."

FIG. 4 (*a*) illustrates data that is supplied to the image processing apparatus by a user. The user may designate the coordinates of the vertices of the figure (e.g., triangle) to be drawn. The coordinates may also be supplied by a file created by an application. In the case of drawing a triangle, three coordinate points vp are designated.

FIG. 4 (*b*) illustrates exemplary vector data generated by the image processing apparatus. That is, three vectors (stS, stE) connecting the vertices are generated. The direction of the vector is not particularly limited to a certain direction, but may be in the clockwise direction, for example. By converting the coordinate data into vector data, internal processes (e.g., rotation, scaling, filling, and drawing order designation) may be facilitated, for example. It is noted that stroke information is not limited to such coordinate data and may also include information on the drawing power and width, for example. In the illustrated example, one vector includes a starting point (stS) and an end point (stE).

FIG. 4 (*c*) illustrates an exemplary scanning command generated by the image processing apparatus. The image processing apparatus performs internal processes on the vector data, and generates a laser scanning command including markers after completing desired processes. Then, the writing control apparatus reads the scanning command and draws the corresponding figure designated by the user on thermal paper.

It is noted that in some cases, the user may wish to draw not only the outline of the figure but also fill in the interior of the figure (also referred to as "filled figure" hereinafter). In this case, once vector data of the drawing object is obtained, appropriate image processes may be performed before generating a laser scanning command.

FIGS. 5A-5C are diagrams illustrating an exemplary manner of drawing a filled figure. In FIG. 5A, the user inputs coordinates of vertices A-E of a pentagon. In FIG. 5B, the image processing apparatus generates vector data by extracting horizontal lines extending from one side to another side of the pentagon using the coordinates of the vertices A-E. It is noted that the vectors of the vector data are spaced apart by a predetermined distance (pitch ph).

In FIG. 5C, the image processing apparatus generates a filled image by controlling the beam position of laser according to the scanning command.

Techniques for filling in an enclosed region in the above described manner are known (see, e.g., Japanese Laid-Open Patent Publication No. 61-52737). Japanese Laid-Open Patent Publication No. 61-52737 discloses a display device that smears out (fills in) a concave polygon by extracting plural convex polygons from the concave polygon.

However, in the case of implementing the technique disclosed in Japanese Laid-Open Patent Publication No. 61-52737, generating the data for filling in the polygon may be quite time-consuming. Although Japanese Laid-Open Patent Publication No. 61-52737 does not disclose a specific manner of generating the data for filling in the polygon, if the data were to be generated by simply searching the point of intersection between a horizontal vector and one side of the polygon, a significant amount of processing time may be required to generate the data.

SUMMARY OF THE INVENTION

It is a general object of at least one embodiment of the present invention to provide an information processing apparatus, an information processing method, and a system that substantially obviate one or more problems caused by the limitations and disadvantages of the related art.

In one embodiment of the present invention, an information processing apparatus is provided that supplies positional information relating to an energy transmitting position to an apparatus that forms visual information on a medium by transmitting energy on the medium while changing the energy transmitting position. The information processing apparatus includes a shape information obtaining unit that obtains shape information of a region, a circumscribed rectangle generating unit that generates a circumscribed rectangle of the region, a parallel line generating unit that generates parallel lines extending across the region at a predetermined interval, an intersection calculating unit that calculates a first intersection point between a parallel line of the parallel lines and a line segment of an outline defining the region that is generated based on the shape information, and at least one of a first data generating unit or a second data generating unit that generate parallel data. The first data generating unit generates the parallel line data by dividing the parallel line at the first intersection point and removing a divided line of the parallel line that overlaps with the circumscribed rectangle. The second data generating unit generates the parallel line data by shortening the parallel line by adjusting an edge point of the parallel line to the first intersection point.

According to an aspect of the present invention, an information processing apparatus that is capable of generating a scanning command for drawing a filled figure at a higher speed may be provided.

BRIEF DESCRIPTION OF THE DRAWINGS

Other objects and further features of embodiments will be apparent from the following detailed description when read in conjunction with the accompanying drawings, in which:

FIGS. 3A and 3B illustrate examples of a drawing object including a character and a figure and a scanning command;

FIG. 4 illustrates exemplary drawing object data for drawing a triangle on thermal paper;

FIG. 6 is a diagram showing an exemplary configuration of a laser writing system;

FIGS. 20A-20B are flowcharts showing exemplary detailed process steps of a vector shortening process of FIG. 19;

FIGS. 24A-24B are flowcharts showing exemplary detailed process steps of a vector shortening process according to the third embodiment.

DESCRIPTION OF THE PREFERRED EMBODIMENTS

In the following, embodiments of the present invention are described with reference to the accompanying drawings.

[System Configuration]

Figure 1:
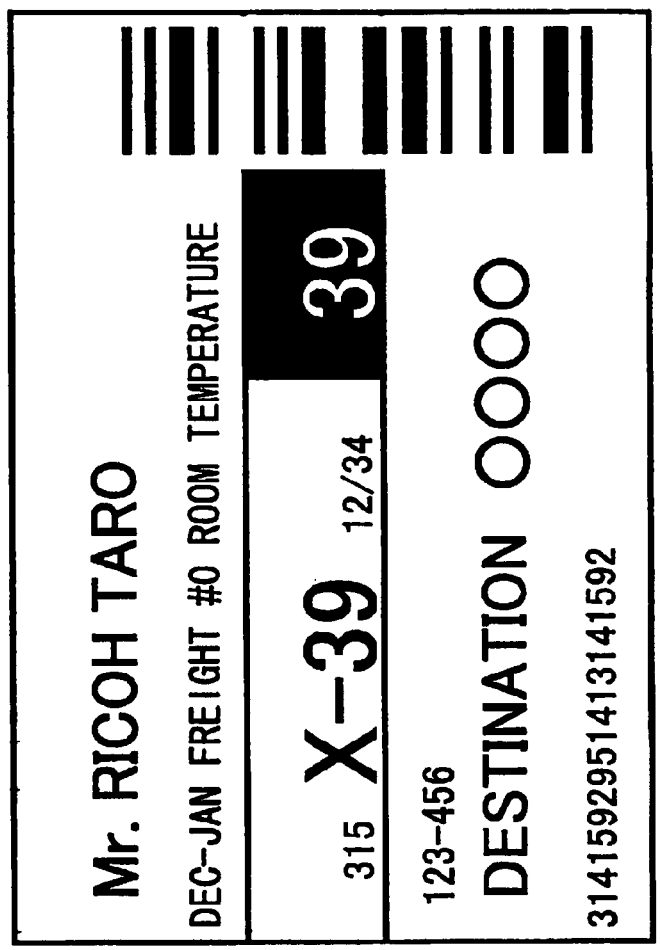
FIG. 1 shows an exemplary label having characters and objects drawn thereon.
Figure 2A:
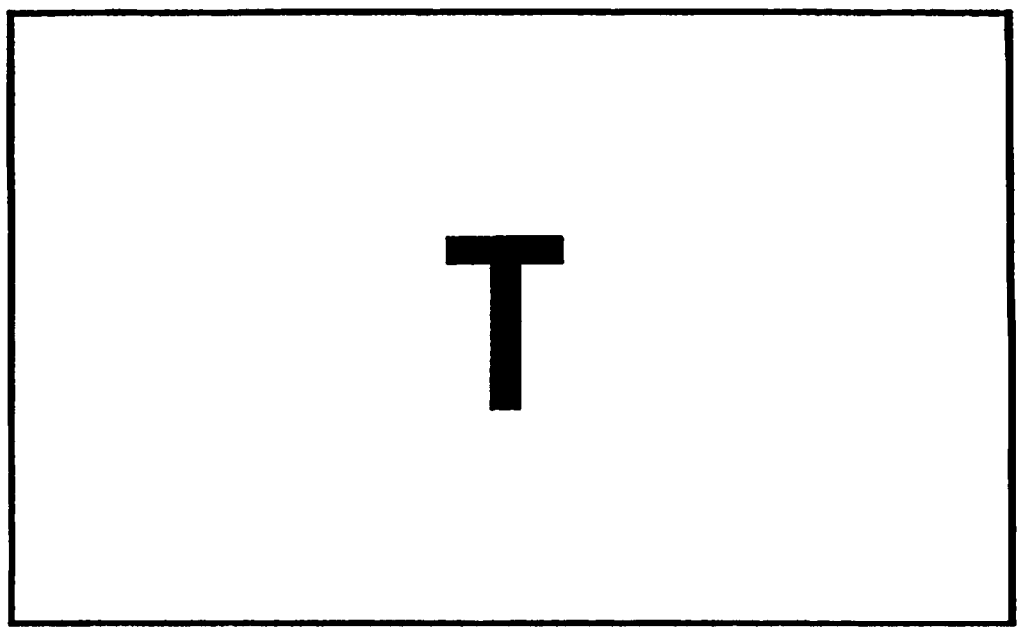
FIGS. 2A and 2B illustrate an example in which the letter T is drawn on thermal paper.
Figure 2B:
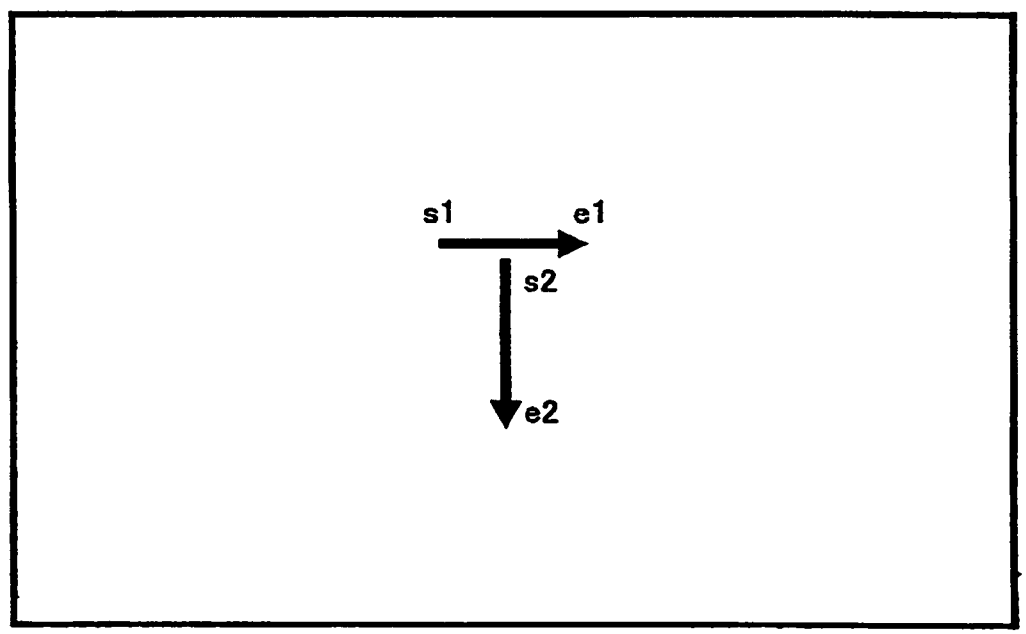
Figure 3A:
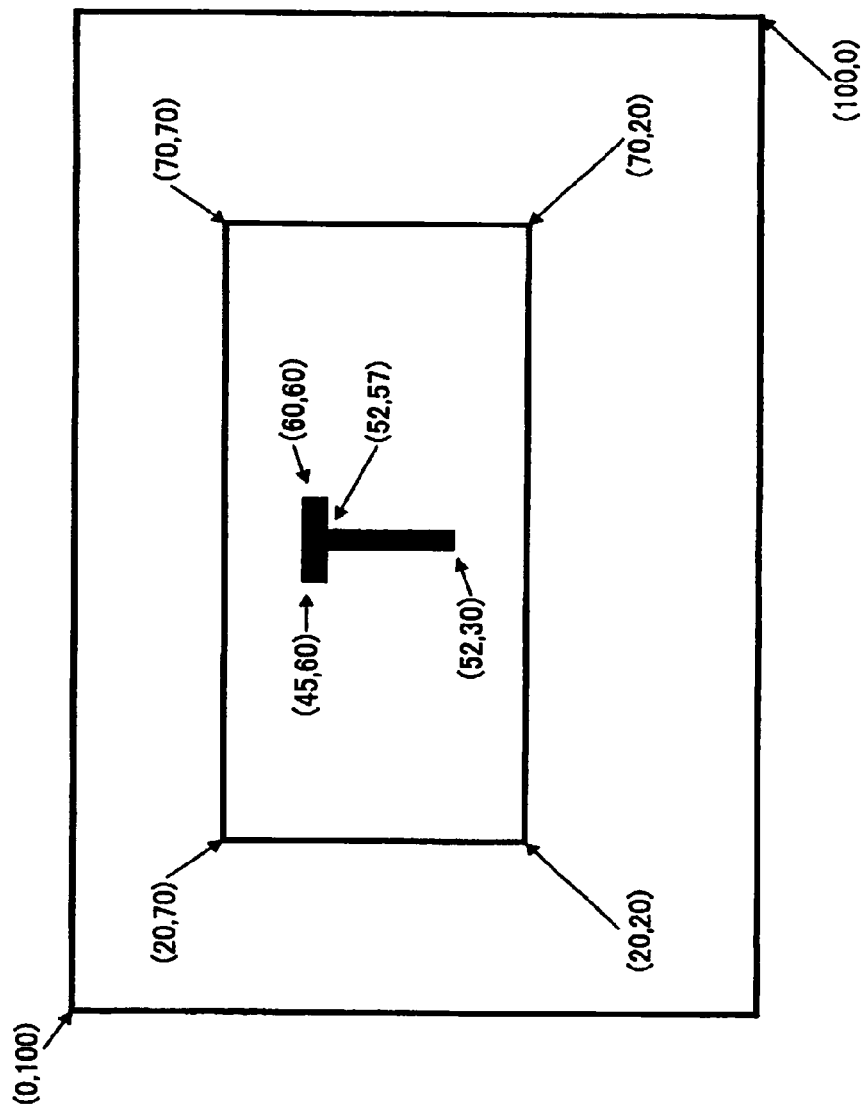

FIG. 6 is a diagram showing an exemplary configuration of a laser writing system 12. In FIG. 6, a container 13 moves along a conveyor 11, and rewritable paper (thermal paper) 14 is fixed, attached, or removably placed on the container 13. The laser writing system 12 is arranged along the conveying path of the conveyor 11 so that it may face opposite the rewritable paper 14. The laser writing system 12 may detect when the container 13 passes by using a sensor, for example, and may draw an object including characters, numbers, symbols, and/or figures such as that shown in FIG. 1.

The laser writing system 12 includes a laser irradiating apparatus 30, a writing control apparatus 20, and an image processing apparatus 100. The writing control apparatus 20 irradiates laser on the rewritable paper 14 and controls the irradiating position of the laser based on a scanning command to draw an object on the rewritable paper 14. The image processing apparatus 100 generates the scanning command and vector data based on coordinate data of the drawing object. It is noted that the writing control apparatus 20 and the image processing apparatus 100 do not necessarily have to be connected to each other. In some embodiments, the writing control apparatus 20 may obtain the vector data or scanning command generated by the image processing apparatus 100 via a recording medium.

In another embodiment, the image processing apparatus 100 may generate vector data and the writing control apparatus 20 may generate the scanning command based on the vector data generated by the image processing apparatus 100. As can be appreciated, some functions of the image processing apparatus 100 and the writing control apparatus 20 may be interchangeable. Also, the writing control apparatus 20 and the image processing apparatus 100 may be embodied in a single apparatus. Thus, the configuration shown in FIG. 6 is merely an illustrative example.

Figure 7:
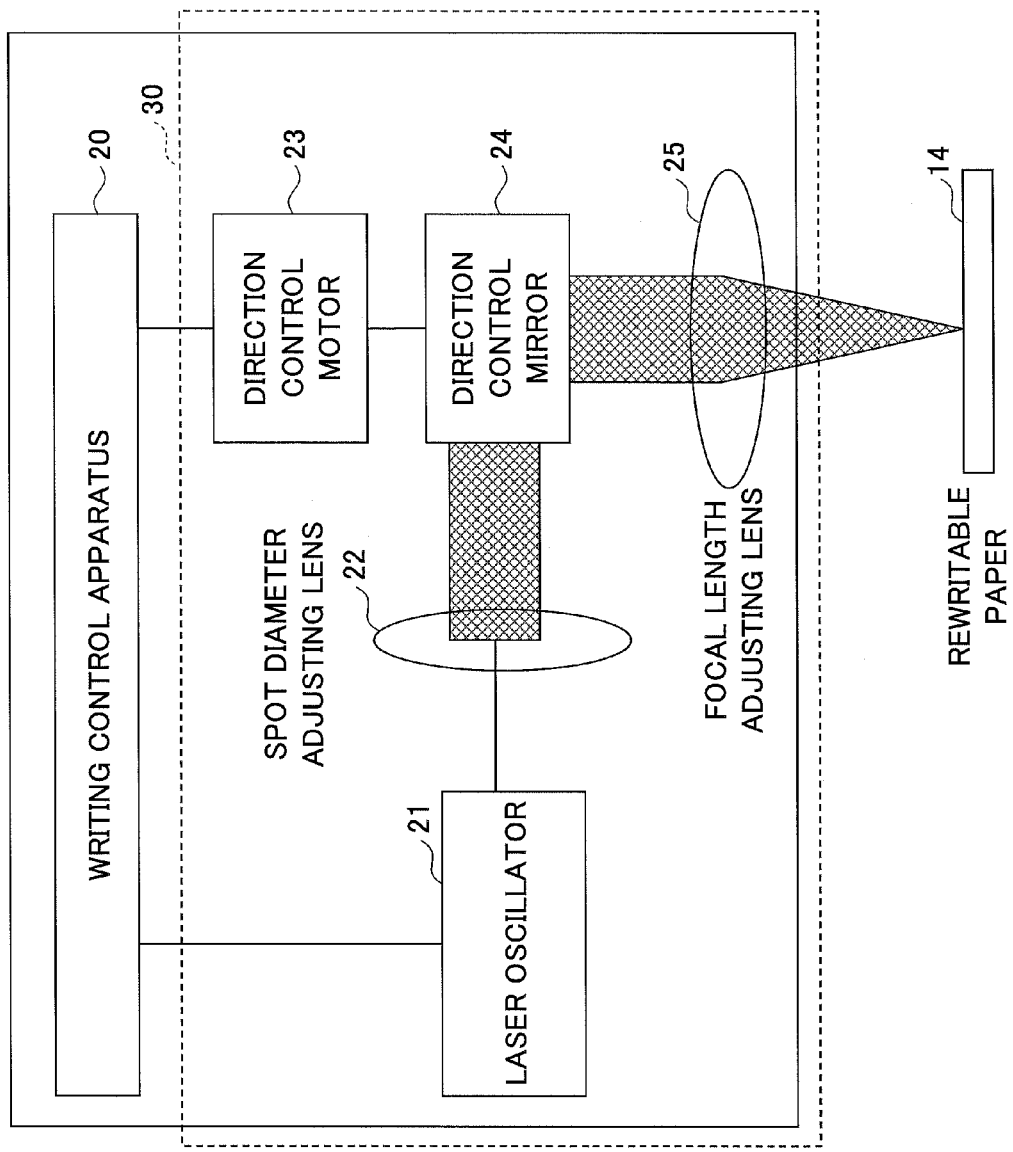
FIG. 7 is a diagram showing an exemplary hardware configuration of a laser irradiating apparatus that is connected to a writing control apparatus.

FIG. 7 is a diagram showing an exemplary hardware configuration of the laser irradiating apparatus 30 that is connected to the writing control apparatus 20. The laser irradiating apparatus 30 includes a laser oscillator 21 that irradiates laser, a direction control mirror 24 that changes the direction of laser, a direction control motor 23 that drives the direction control mirror 24, a spot diameter adjusting lens 22, and a focal length adjusting lens 25.

In the present embodiment, the laser oscillator 21 is a semiconductor laser (LD: laser diode). However, in other embodiments, the laser oscillator 21 may be a gas laser, a solid-state laser, or a liquid laser, for example. The direction control motor 23 may be a servomotor that controls the direction of reflection surfaces of the direction control mirror 24 along two axes, for example. In the present embodiment, the direction control motor 23 and the direction control mirror 24 realize a galvano mirror. The spot diameter adjusting lens 22 adjusts the spot diameter of laser light. The focal length adjusting lens 25 adjusts the focal length of laser light by converging the laser light.

When the writing control apparatus 20 supplies a duty cycle PWM signal based on a laser output control value and a voltage or an electric current based on a control value included in a control command to the laser oscillator 21, a beam with an intensity adjusted according to the control values may be irradiated. In the case of adjusting the drawing speed, the writing control apparatus 20 first obtains the laser scanning angle. Since the distance between the laser irradiating apparatus 30 and the rewritable paper 14 is fixed, the laser scanning angle may be obtained by determining the direction of the angle control mirror 24 for irradiating laser on the starting point of a stroke or line segment and the direction of the angle control mirror 24 for irradiating laser on the end point of the stroke or line segment. The writing control apparatus 20 may vary the laser irradiating position of the angle control mirror 24 from the starting point direction to the end point direction based on a drawing speed control value included in the control command. For example, in the case of using a galvano mirror, the direction of the angle control mirror 24 may be controlled by a voltage applied to a coil in a magnetic field. A conversion table for converting an X-axis direction and a Y-axis direction into a voltage may be provided beforehand, and the drawing speed may be changed at a constant angular velocity based on the drawing speed control value included in the control command.

The rewritable paper 14 includes a protective layer, a recording layer including a thermo-reversible film, a base layer, and a back coat layer that are arranged in this order from the top side towards the bottom side. The rewritable paper 14 is preferably provided with a certain degree of flexibility as well as durability so that it may be reused multiple times. It is noted that the rewritable paper 14 is not limited to a medium made of plant fiber such as paper and may also be a medium made of inorganic matter, for example.

The rewritable paper 14 includes a rewritable display region corresponding to a reversible display region on which objects may be rewritten. The rewritable display region may include a reversible thermo-sensitive medium such as a thermo-chromic film. The reversible thermo-sensitive medium may be of a type that can reversibly change transparency depending on the temperature, or a type that can reversibly change color tone depending on the temperature.

In the present embodiment, a thermo-reversible film that includes leuco dye and a color developer in the recording layer to realize rewritable characteristics is used as a reversible thermo-sensitive medium that can reversibly change color tone depending on the temperature.

It is noted that color may be developed from a decolored state by heating the leuco dye and the color developer to their melting point (e.g., 180° C.) to cause bonding of the materials and then rapidly cooling the materials. In this case, the dye and the color developer may be aggregated while they are still bound together to form a colored state.

On the other hand, decoloring may be realized by reheating the leuco dye and the color developer to a temperature that would not cause the materials to melt (e.g., 130-170° C.). In this case, the bond between the leuco dye and the color developer may be broken and the color developer may crystallize on its own to form a decolored state.

It is noted that the leuco dye used in the present embodiment may be any type of colorless or light-colored dye precursor that may be selected from conventionally known types of dye precursors.

The image processing apparatus 100 of the present embodiment is configured to draw an object on a rewritable recording medium with desirable coloration quality. The image processing apparatus 100 may also be configured to draw an object on a non-rewritable (write-once) recording medium. In one embodiment, the drawing speed and the laser output may be adjusted according to the sensitivity of the recording medium. That is, the appropriate drawing speed and laser output for drawing on a rewritable recording medium may differ from the appropriate drawing speed and laser output for drawing on a non-rewritable recording medium. Thus, the drawing speed and laser output may be adjusted to appropriate ranges for drawing an object on a non-rewritable recording medium. Also, it is noted that laser irradiation control according to an embodiment of the present invention may be realized without a recording medium.

First Embodiment

Figure 8A:
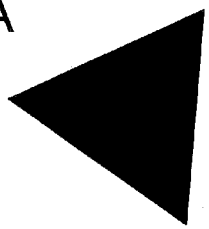
FIGS. 8A-8H illustrate an exemplary manner in which an image processing apparatus generates vector data.
Figure 8E:
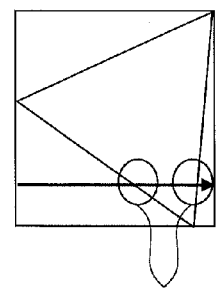
Figure 8B:
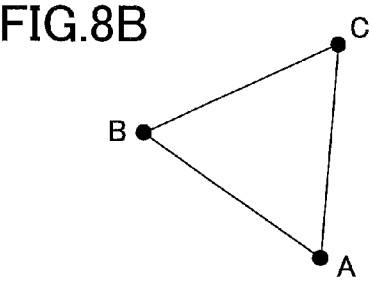
Figure 8F:
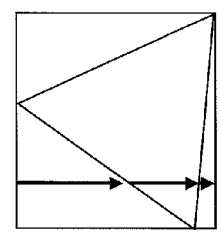
Figure 8C:
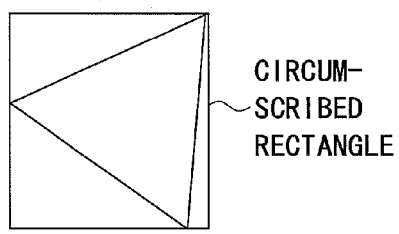
Figure 8G:
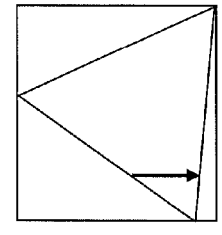
Figure 8D:
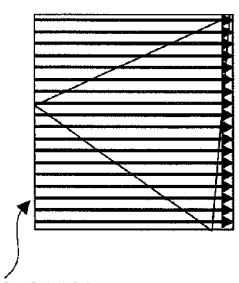
Figure 8H:
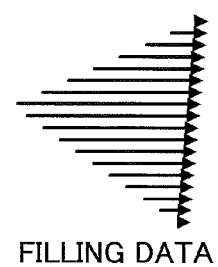

FIGS. 8A-8H illustrate an exemplary manner in which the image processing apparatus 100 generates vector data. FIG. 8A shows a filled figured corresponding to the object to be drawn. In the present example, a triangle figure is illustrated as the drawing object. FIGS. 8B-8G illustrate process steps for generating vector data for drawing the drawing object shown in FIG. 8A. In FIG. 8B, the user inputs the coordinates of the three vertices of the triangle figure to the image processing apparatus 100. In FIG. 8C, the image processing apparatus 100 generates a circumscribed rectangle based on the coordinate points of the vertices. It is noted that the vectors of the vector data for filling the triangle figure are included within this circumscribed rectangle. In FIG. 8D, the image processing apparatus 100 fills the circumscribed rectangle to generate provisional vector data. In FIG. 8E, the image processing apparatus 100 extracts each provisional vector of the provisional vector data and obtains the points of intersection between the extracted provisional vector and the sides of the triangle (figure outline). It is noted that the portions of the provisional vector data that are within the triangle corresponds to the target vector data. In FIG. 8F, the image processing apparatus 100 divides up the provisional vector data at the intersection points. In FIG. 8G, the image processing apparatus 100 removes portions of the divided provisional vector data that are outside the triangle figure, and the vector data of the remaining vectors correspond to the target vector data. FIG. 8H shows filling data for filling the triangle figure that is obtained by performing the above process steps on the provisional vector data.

According to an aspect of the present embodiment, by performing the above process steps, vector data for filling a polygon may be efficiently generated, for example.

[Apparatus Configuration]

Figure 9A:
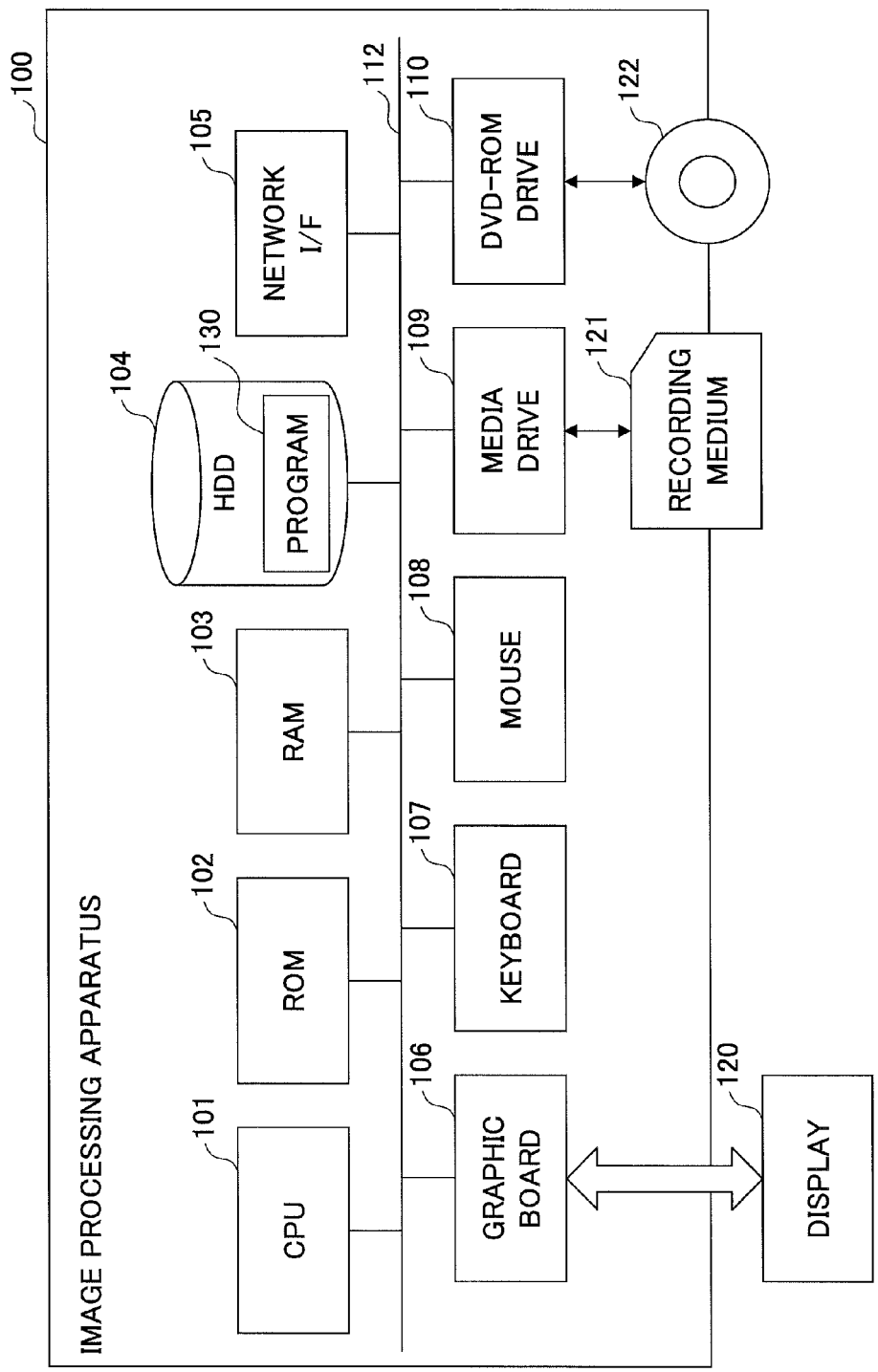
FIGS. 9A and 9B are block diagrams showing exemplary hardware configurations of the image processing apparatus and the writing control apparatus.

FIG. 9A is a block diagram showing an exemplary hardware configuration of the image processing apparatus 100. It is noted that the image processing apparatus 100 may be a conventional information processing apparatus such as a personal computer, a workstation, a tablet computer, for example.

The image processing apparatus 100 includes a CPU 101, a ROM 102, a RAM 103, a HDD 104, a network interface (I/F) 105, a graphic board 106, a keyboard 107, a mouse 108, a media drive 109, and an optical disk drive 110. The CPU 101 executes a program 130 stored in the HDD 104 and performs overall control of the image processing apparatus 100. The ROM 102 stores IPL (Initial Program Loader) and static data. The RAM 103 is used by the CPU 101 as a working area to execute the program 130 stored in the HDD 104.

The HDD 104 stores the program 130 and OS (operating system) to be executed by the CPU 101. The program 130 is run on the image processing apparatus 100 to generate a control command based on configuration information such as the frame and the tips of a figure to be drawn, for example. The network I/F 105 may be an Ethernet (registered trademark) card, for example, that establishes connection between the image processing apparatus 100 and a network. It is noted that the network interface 105 operate mainly in layers 1 and 2. Functions and services provided by layers 3 or higher may be performed by a TCP/IP protocol stack or program included in the OS.

The graphic board 106 interprets a drawing command written by the CPU 101 on a video RAM and displays various items of information such as a window, a menu, a cursor, characters, and/or an image on a display 120.

The keyboard 107 includes keys representing characters, numerical values, and symbols for inputting various commands. The keyboard 107 accepts a user operation input and notifies the CPU 101 of the user input. Similarly, the mouse 108 accepts a user operation input such as the movement of a cursor or the selection of a process from a menu, for example.

The media drive 109 controls reading and writing (recording) of data on a recording medium 121 such as a flash memory. The optical disk drive 110 controls reading and writing of data on a removable optical medium 122 such as a Blu-ray disk, a CD, or a DVD, for example. The image processing apparatus 100 also includes a bus line 112 for establishing electrical connection between the above hardware components.

In one embodiment, the program 130 may be recorded on a computer-readable medium such as the recording medium 121 or the optical medium 122 in a computer-installable and computer-executable file format. In another embodiment, the program 130 may be downloaded in the image processing apparatus 100 from a server (not shown) as a computer-installable and computer-executable file.

Figure 9B:
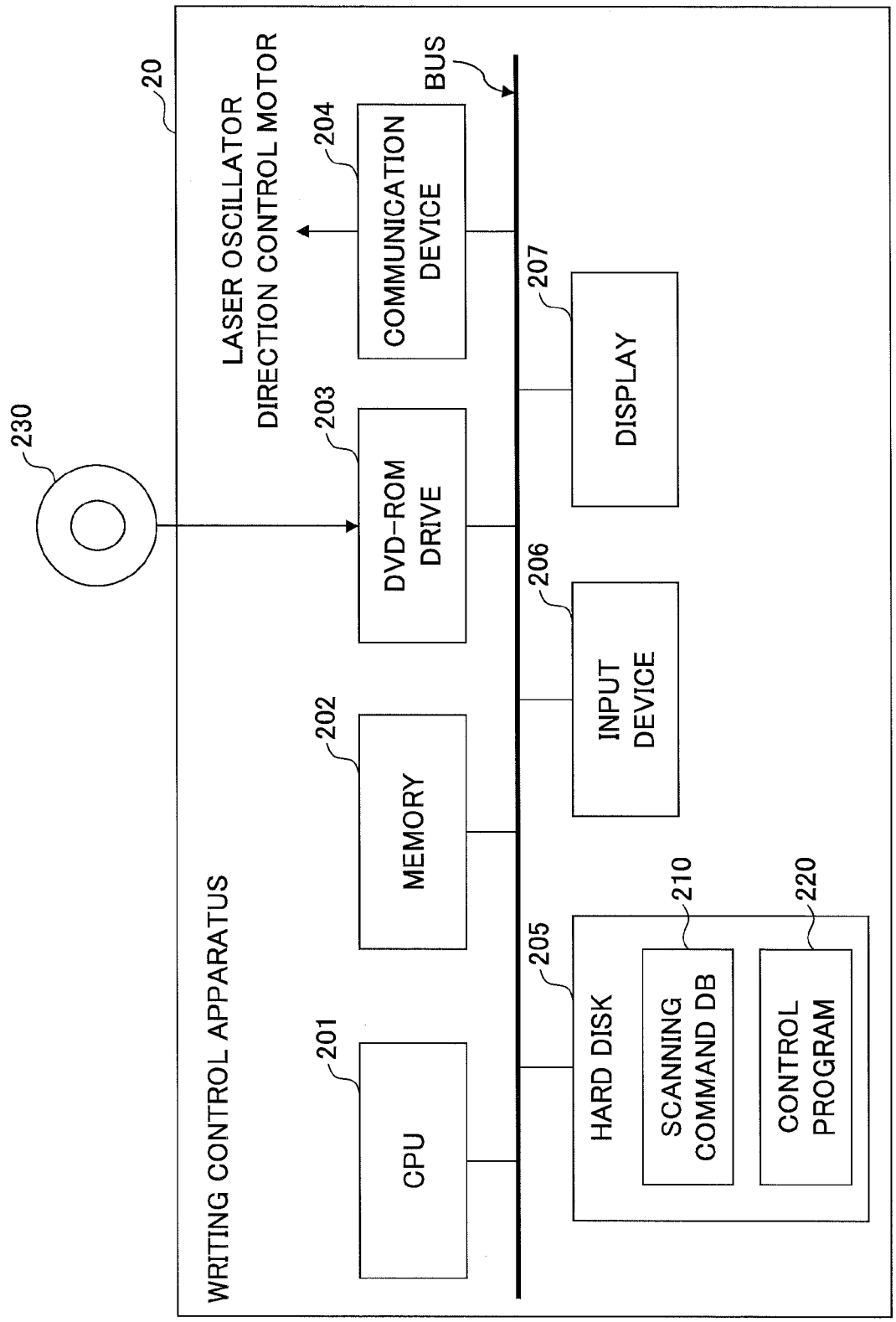

FIG. 9B is a block diagram showing an exemplary hardware configuration of the writing control apparatus 20. It is noted that FIG. 9B illustrates an exemplary case in which the writing control apparatus 20 is realized by a computer and functions of the writing control apparatus 20 are implemented mainly by software. It is noted that in other embodiments, the writing control apparatus 20 may be realized without using a computer by using an IC dedicated for a specific function such as an ASIC (Application Specific Integrated Circuit).

The writing control apparatus 20 includes a CPU 201, a memory 202, a storage medium I/F 203, a communication device 204, a hard disk 205, an input device 206, and a display 207. The hard disk 205 stores a control command DB 210 that has control commands for filling a figure, or drawing a character, a number, or a symbol registered therein, and a control program 220 for controlling the laser oscillator 21 and the direction control motor 23 based on a scanning command.

The CPU 201 reads the control program 220 from the hard disk 205 and executes the control program 220 to draw an object such as a character on the rewritable paper 14. The memory 202 may be a volatile memory such as a DRAM (Dynamic Random Access Memory) that may be used by the CPU 201 as a working area for executing the control program 220. The input device 206 may include devices such as a keyboard and/or a mouse that enable a user to input a command for controlling the laser irradiating apparatus 30. The display 207 is a user interface that displays a GUI (Graphic User Interface) screen at a predetermined resolution and a predetermined color depth based on screen information designated by the control program 220, for example. The display 207 may display an entry field for entering a character or object to be drawn on the rewritable paper 14, for example.

The storage medium I/F 203 may have a removable storage medium 230 installed therein. The storage medium interface 203 is used to read data from the storage medium 230 and/or write data on the storage medium 230. In one embodiment, the control program 220 and the control command DB 210 may be stored in the storage medium 230 and distributed in this manner. In this case, the control program 220 and the control command DB 210 may be read from the storage medium 230 and installed in the hard disk 205. In another embodiment, the control program 220 and the control command DB 210 may be downloaded from a predetermined server that is connected to the writing control apparatus 20 via a network.

The storage medium 230 is a non-volatile memory that is removable and portable such as a Blu-ray disk, a CD, a DVD, a SD card, a multimedia card, or an xD card. The communication device 204 is used for sending a control command to the laser oscillator 21 or the direction control motor 23 and may be an Ethernet card or a serial communication device such as a USB (Universal Serial Bus), an IEEE 1394 port, or a Bluetooth (registered trademark) port, for example.

Figure 10:
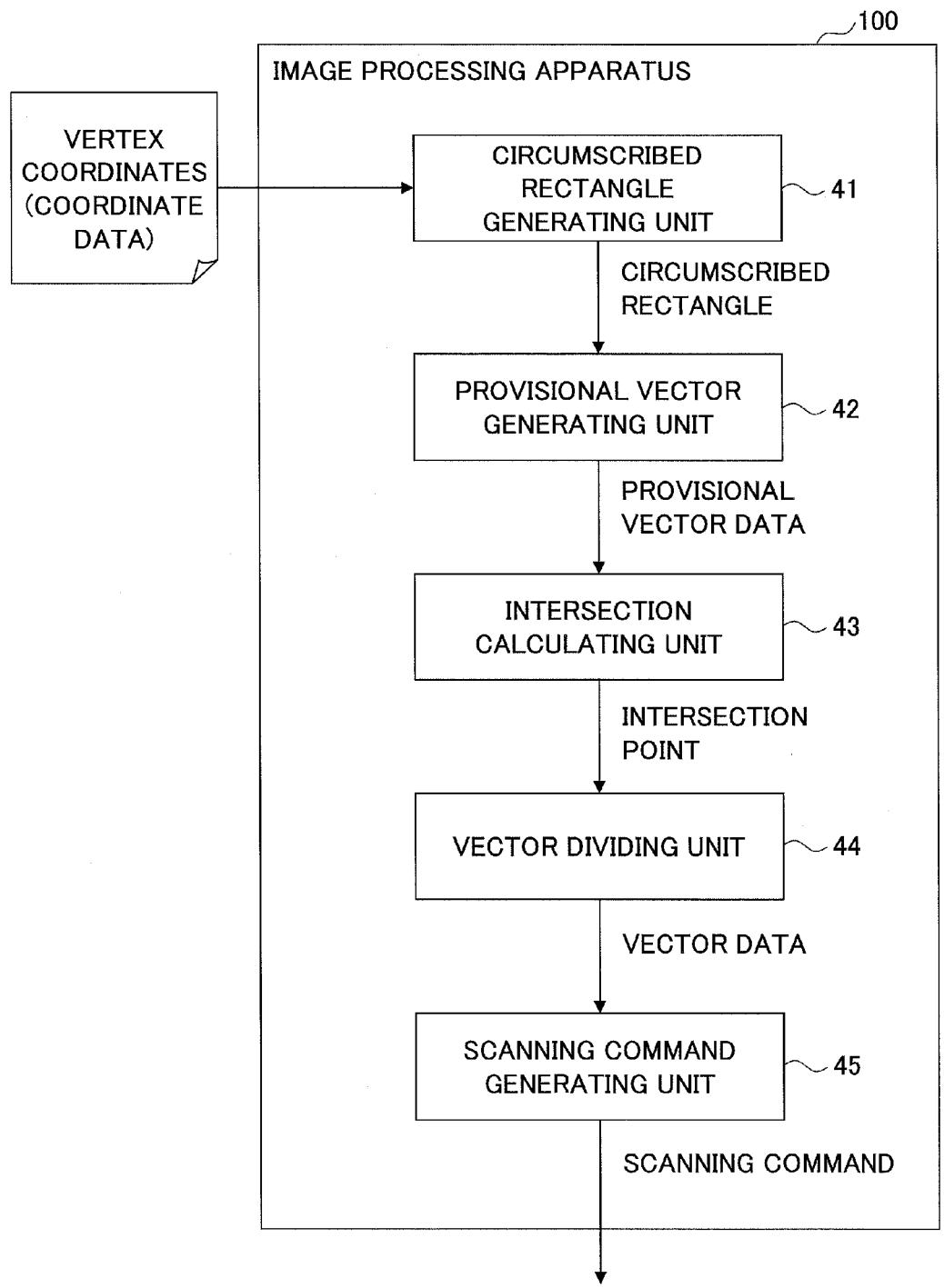
FIG. 10 is a block diagram showing an exemplary functional configuration of the image processing apparatus.

FIG. 10 is a block diagram showing an exemplary functional configuration of the image processing apparatus 100. The image processing apparatus 100 includes a circumscribed rectangle generating unit 41, a provisional vector generating unit 42, an intersection calculating unit 43, a vector dividing unit 44, and a scanning command generating unit 45. These functional units may be realized the CPU 101 executing the program 130 to operate in cooperation with hardware components.

The circumscribed rectangle generating unit 41 obtains the coordinates of the vertices of a polygon figure input by a user and generates a circumscribed rectangle of the polygon figure. The coordinate data (shape information) of the polygon figure may be input by the user via a keyboard or a mouse, or by reading a text file that describes the coordinate data of the vertices, for example. In another example, the circumscribed rectangle generating unit 41 may perform an image process on bitmap data to extract the vertex coordinates.

The provisional vector generating unit 42 generates provisional vector data (parallel lines) that fill in the internal region of the generated circumscribed rectangle. In the following descriptions, it is assumed that the pitch of the provisional vector data (intervals of the vectors in the perpendicular direction) is predetermined by factors such as the spot diameter, the laser output, and the coloration properties of the rewritable paper 14 (the pitch itself may be changed). Although it is assumed that the pitch is fixed upon drawing a given figure, the pitch between the vectors of the provisional vector data for filling a given figure may be changed.

The intersection calculating unit 43 calculates the intersection points between the sides of the polygon and the provisional vector data. As for the calculation method, the sides of the polygon and the provisional vectors of the provisional vector data may be converted into linear equations and conventionally known formulas may be used to calculate their intersection points.

The vector dividing unit 44 divides the provisional vector data at the intersection points. That is, with respect to each provisional vector of the provisional vector data, the vector dividing unit 44 divides the provisional vector at one intersection point with one side of the polygon and another intersection point with another side of the polygon so that each provisional vector of the provisional vector data is divided into three (two in the case where the vector passes through a vertex of the polygon). In turn, the vector dividing unit 44 erases (removes) the provisional vector data outside the polygon figure. In this way, the vector dividing unit 44 generates vector data for filling the interior of the polygon figure. It is noted that although the number of segments into which the provisional vector is divided depends on the shape of the polygon figure, in the example described below, it is assumed that the provisional vector is divided into three segments (or two in the case where the provisional vector intersects a vertex of the polygon figure).

The scanning command generating unit 45 generates a scanning command (control data) based on the vector data. The scanning command may be optimized according to the specification of the writing control apparatus 20 and the coloration properties of the rewritable paper 14, for example. In one example, the vector data of vectors all in one direction may be converted to vector data of vectors in alternating directions at the scanning command generation stage.

Comparative Example

In the following, exemplary process steps for generating vector data according to a comparative example are described. It is noted that the image processing apparatus 100 may implement one or more of the functional features of this comparative example as well as functional features of embodiments of the present invention.

Figure 5A:
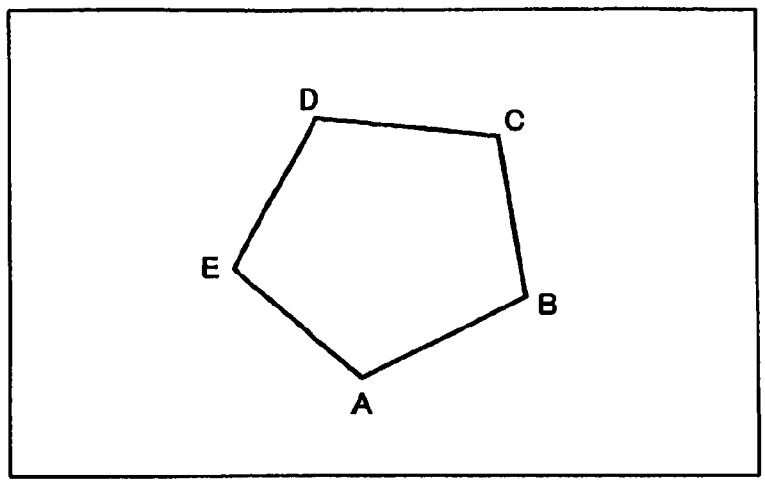
FIGS. 5A-5C illustrate an exemplary manner of drawing a filled figure.
Figure 5B:
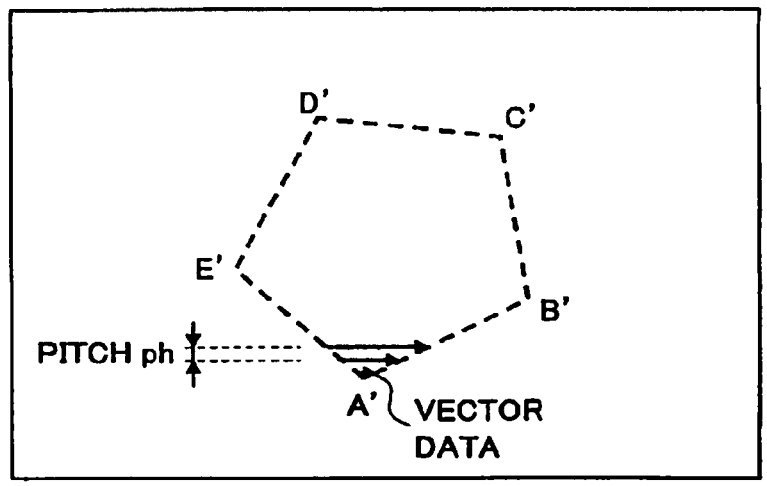
Figure 5C:
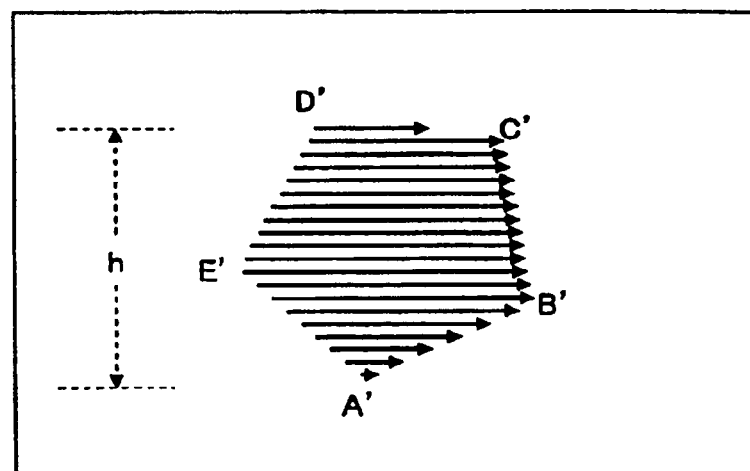
Figure 11A:
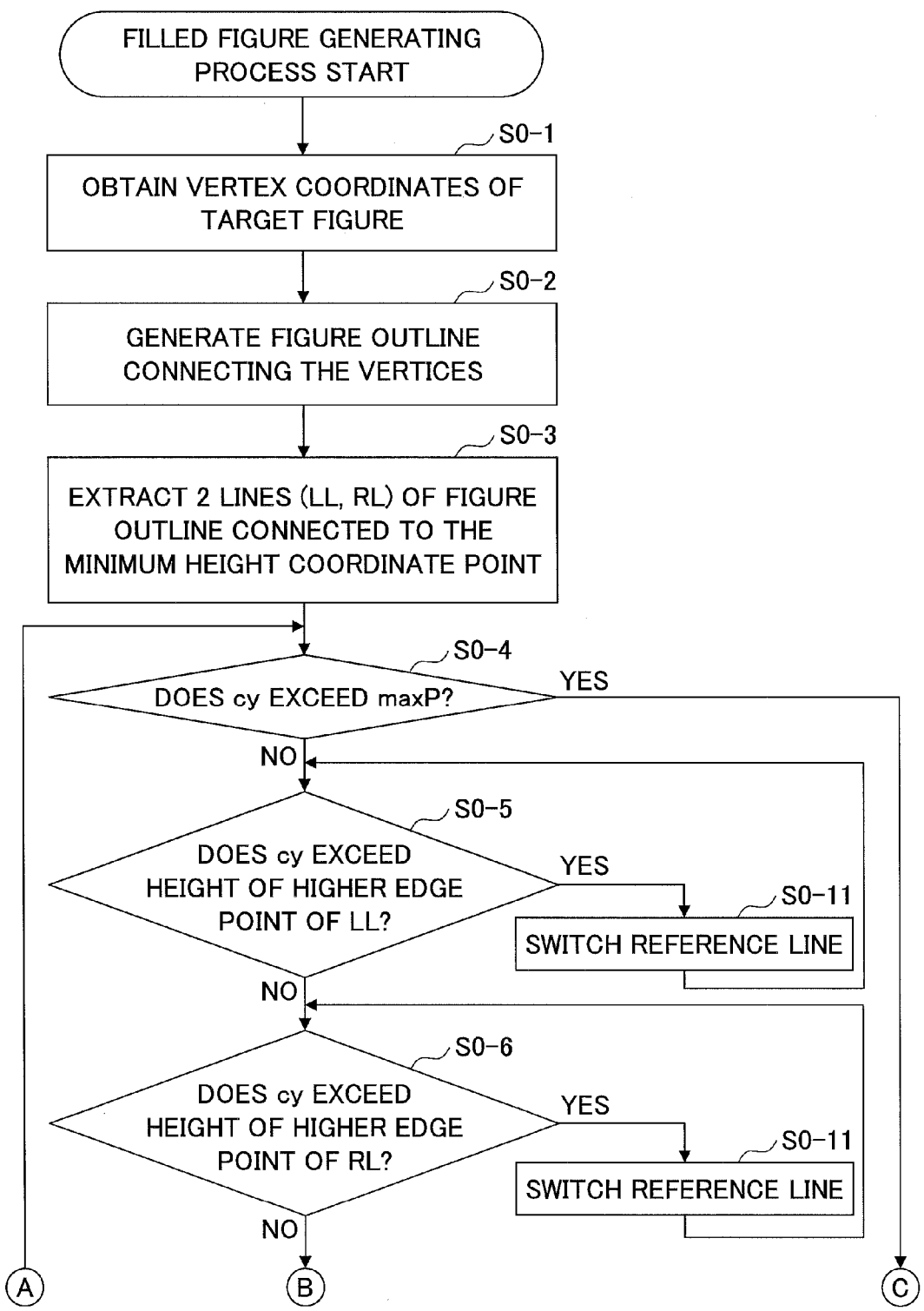
FIGS. 11A-11B are flowcharts showing exemplary process steps for generating a scanning command from designated vertex coordinates of a polygon figure according to a comparative example.
Figure 11B:
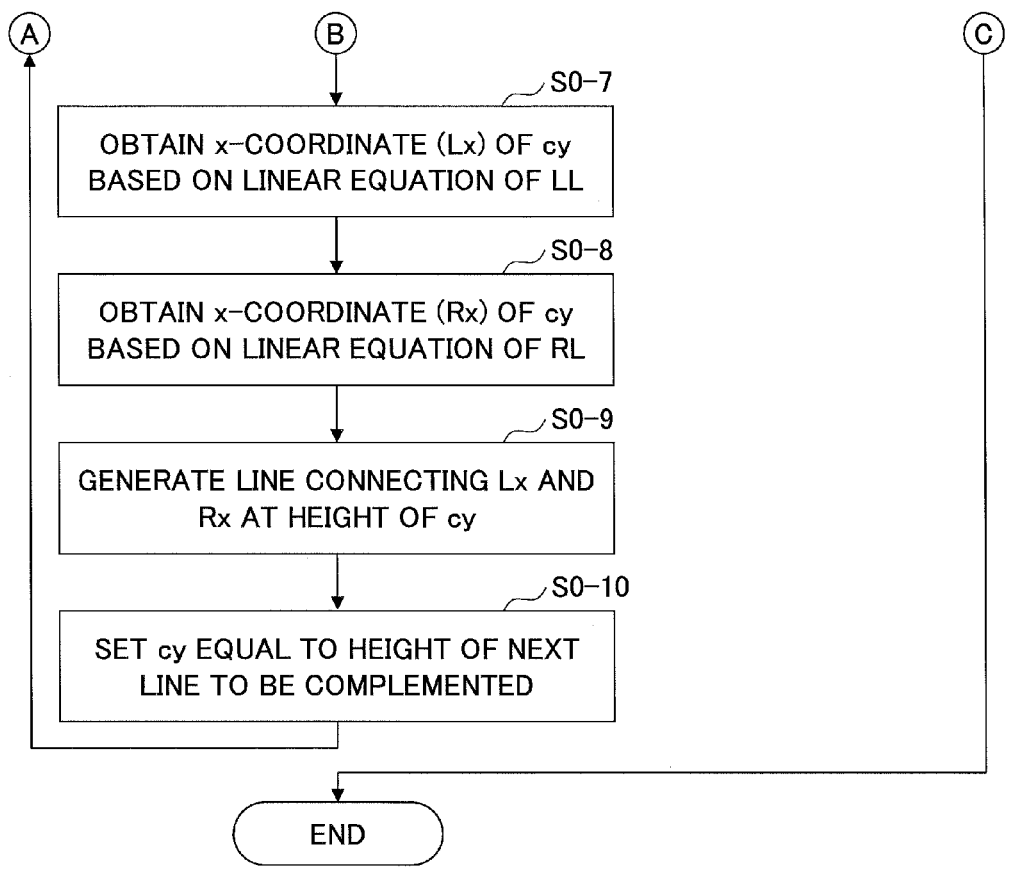
Figure 12:
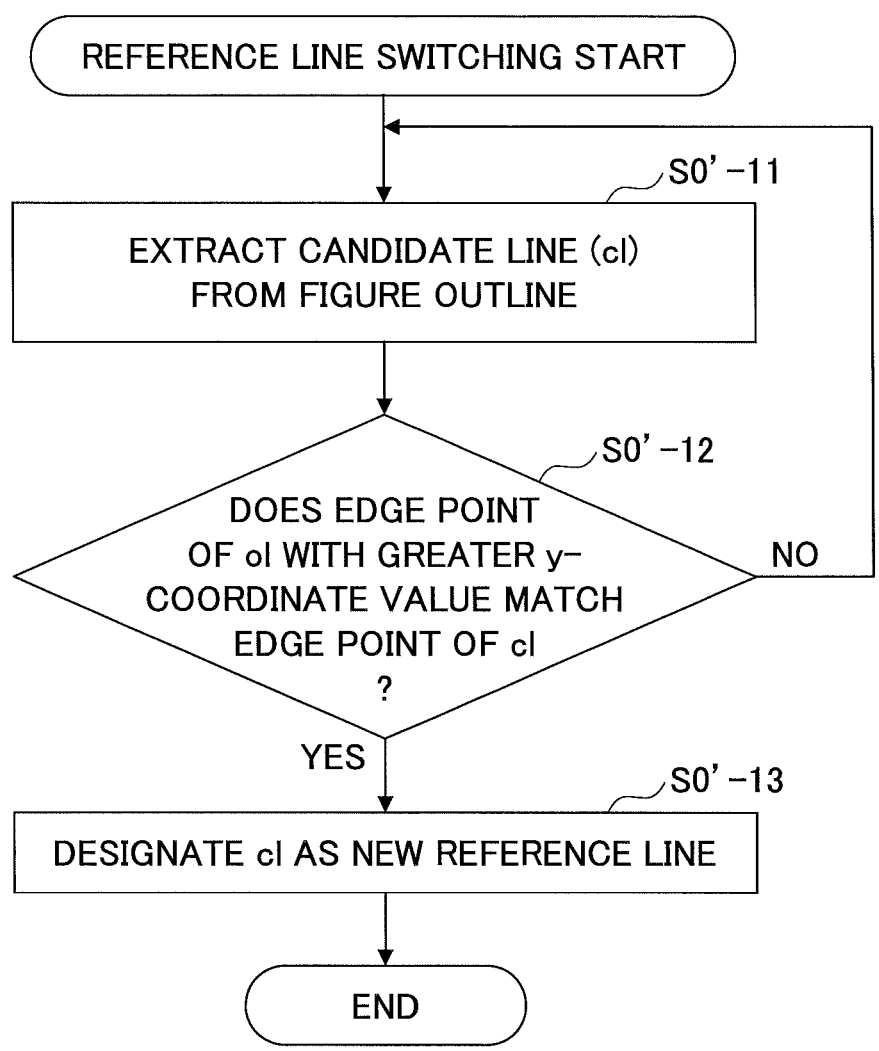
FIG. 12 is a flowchart showing exemplary detailed process of step S0-11 of FIG. 11A.

FIGS. 11A-11B and 12 are flowcharts showing exemplary process steps for generating a scanning command based on designated vertex coordinates of a polygon figure according to the comparative example. In the present example, it is assumed that the polygon figure shown in FIGS. 5A-5C corresponds to the drawing object.

First, the image processing apparatus 100 accepts input data designating the shape of a polygon figure to be filled from a user, for example (S01-1). The input data may be coordinate data of the coordinates of the vertices of the polygon figure (A-E in FIGS. 5A-5C).

Then, the image processing apparatus 100 generates lines (line segments) connecting the vertices of the polygon figure based on the accepted coordinate data. The lines (line segments) correspond to the so-called "sides" of the polygon figure and are collectively referred to as "figure outline" hereinafter. The figure outline includes at least the starting point coordinates and the end point coordinates of the lines, for example.

Then, the image processing apparatus 100 selects the vertex with the lowest height, for example, and extracts the two line segments of the figure outline that include the selected vertex as one edge point (i.e., lines AE and AB in FIGS. 5A-5C) (S0-3). This process step is for determining the starting point for generating the filling data. In the case of drawing the figure in FIGS. 5A-5C, line AE corresponds to line LL of FIG. 11A and line AB corresponds to line RL of FIG. 11A. It is noted that although the lowest coordinate point is used as a reference in the present example, the reference point may alternatively be the highest coordinate point or some other coordinate point.

Then, the image processing apparatus 100 determines whether the currently referenced height cy is greater than the highest coordinate point maxP (point D in FIGS. 5A-5C) of the vertex coordinate data (S0-4). This determination process step is for determining whether a condition for terminating the process of FIGS. 11A-11B has been met. It is noted that the height cy referenced right after starting the process corresponds to the y-coordinate value of the lowest vertex. In the comparative example, vector data is created one vector at a time with respect to each pitch and vector data does not yet exist at the currently referenced height cy.

Also, in the case where the highest coordinate point is used as the reference point in step S0-3, the lowest coordinate point minP may be used as the determination criterion in step S0-4.

If a negative determination is made in step S0-4, the image processing apparatus 100 determines whether the currently referenced height cy is greater than the height of the higher edge point of line LL (edge point E of line AE in FIGS. 5A-5C) (S0-5).

If the currently referenced height cy is greater than the height of the higher edge point (E) of line LL (S0-5, Yes), the image processing apparatus 100 switches the reference line (S0-11).

If the currently referenced height cy is not greater than the height of the higher edge point (E) of line LL (S0-5, No), the image processing apparatus 100 determines whether the currently referenced height cy is greater than the height of the higher edge point of line RL (edge point B of line AB in FIGS. 5A-5C) (S0-6).

If the currently referenced height cy is greater than the height of the higher edge point (B) of line RL (S0-6, Yes), the image processing apparatus 100 switches the reference line (S0-11).

If the currently referenced height cy is not greater than the height of the higher edge point (B) of line RL (S0-6, No), the image processing apparatus 100 obtains the linear equation of line LL (line AE), and obtains the x-coordinate value Lx of the line at the height cy (S0-7). The x-coordinate value Lx corresponds to the coordinate value of one of the edge points of the vector to be generated for the currently referenced height cy.

Similarly, the image processing apparatus 100 obtains the linear equation of line RL (line AE), and obtains the x-coordinate value Rx of the line at the height cy (S0-8). The x-coordinate value Rx corresponds to the coordinate value of the other edge point of the vector to be generated for the corresponding height cy.

After the values Lx and Rx are obtained, the image processing apparatus 100 generates a horizontal line connecting the coordinates Lx and Rx at the corresponding height cy (S0-9). The horizontal line may be regarded as a vector (vector data) that connects the edge points (Lx, cy) and (Rx, cy), for example.

After generating the vector data at the height cy, the value of the height cy is updated by incrementing the current height cy by a distance of the pitch (S0-10).

Then, the process steps are repeated from step S0-4 to generate vector data for filling the polygon figure.

It is noted that when the value of the currently referenced height cy reaches the y-coordinate value the highest point (D in FIGS. 5A-5C) in step S0-4, the image processing apparatus 100 regards the process of generating the vector data for filling the polygon figure as completed and ends the process.

It is noted that in steps S0-7 through S0-9, the horizontal line is generated based on the x-coordinate values of the lines LL and RR at the height cy. In this way, a horizontal line with edge points located on the figure outline may be generated. It is noted that when the height cy exceeds the height of line LL (line A-E); namely, when the height cy exceeds the y-coordinate value of the higher edge point of line LL, for example, the line connected to the current line LL (i.e., line E-D in FIGS. 5A-5C) is used as a reference for generating horizontal lines at higher positions (S0-11).

FIG. 12 is a flowchart showing exemplary process steps for switching the reference line in step S0-11 of FIG. 11A. In FIG. 12, "ol" corresponds to the line referenced in step S0-11 when a positive determination is made in step S0-5 or step 0-6. That is, "ol" corresponds to the reference line (e.g., line A-E of FIGS. 5A-5C) that has been determined to be less than the currently referenced height cy.

First, the image processing apparatus 100 selects a line other than line ol as a connected line candidate denoted as "cl" (S0'-11). For example, assuming line A-E of FIGS. 5A-5C corresponds to line ol, line E-D, line D-C, line C-B, or line B-A may be selected as line cl.

After selecting line cl, the image processing apparatus 100 compares the higher edge point of line ol (E in FIGS. 5A-5C) with the edge points of line cl (e.g., edge points E and D in the case where line ED is selected as line cl) (S0'-12).

If one of the edge points of line cl corresponds to the higher edge point of line ol, this means that lines ol and cl are connected to each other and the image processing apparatus 100 designates the selected line cl as the next reference line (S0'-13).

On the other hand, if neither of the edge points of the selected line cl corresponds to the higher edge point of line ol, the process goes back to step S0'-1 and the image processing apparatus 100 selects one of the remaining lines (e.g., line D-C, line C-B, or line B-A in FIGS. 5A-5C) as the connected line candidate line cl and repeats the above process steps until the line segment of the figure outline connected to the current reference line ol is identified.

When the new reference line is determined in step S0'-13, the process goes back to step S0-5 or S0-6 of FIG. 11A. Then, the image processing apparatus 100 determines whether the currently referenced height cy is within the height range of the newly designated reference line. If the currently referenced height cy is determined to be within the height range of the new reference line, the process proceeds to the subsequent process steps.

By performing the above process steps, the image processing apparatus 100 may generate horizontal lines at every predetermined pitch corresponding to filling data for filling the polygon figure to be drawn.

However, process steps for generating the filling data according to the above comparative example may not be suitable for generating filling data for certain types of figures. For example, the comparative example may not be suitable for generating filling data for filling figures having of a relatively large number of coordinate points.

Examples of "figures having a relatively large number of coordinate points" include a circular shape, a heart shape, and other shapes defined by curved lines. Since the laser irradiating apparatus 30 is only designed to draw straight lines, in the case of drawing circles and curved lines, the image processing apparatus 100 replaces the outline of the circle or curved line with short straight lines.

Figure 13:
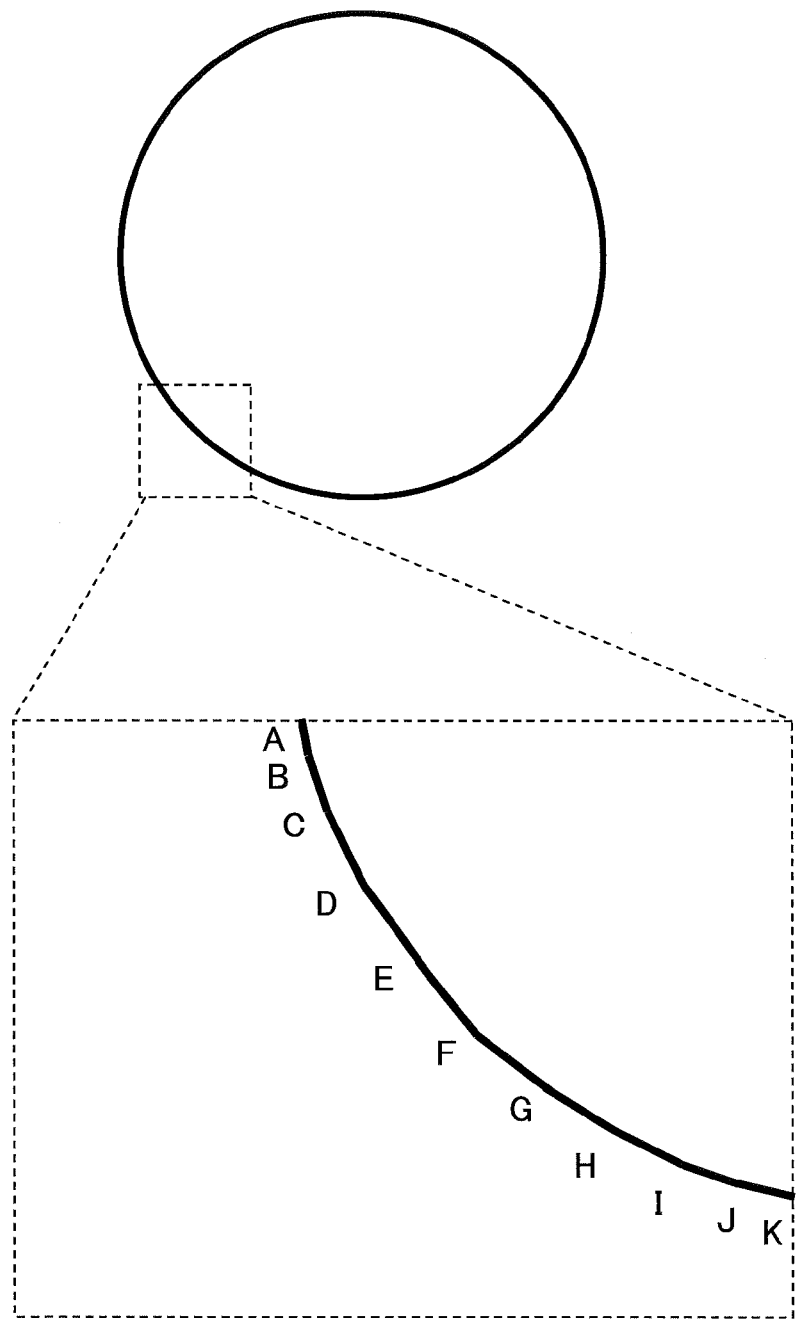
FIG. 13 is a diagram illustrating an exemplary manner of generating short straight lines to draw a circle.

FIG. 13 is a diagram illustrating an exemplary manner of generating short straight lines to draw a circle. Since the writing control unit 20 cannot directly draw circles and curved lines, the image processing apparatus 100 converts the circle or curved line into short straight lines (e.g., lines A-B, B-C, ..., J-K, etc.) beforehand. It is noted that a circular figure or a figure with a curved line described in this manner is treated like a polygon with the edge points of each straight line defining the outline of the figure. That is, in terms of data, a circle or a curved figure is treated as a polygon figure having many coordinate points, and the number of vertices and lines defining the figure is increased to draw a smoother circle, for example.

The process steps of FIGS. 11 and 12 may not be suitably applied to a case of drawing such a figure defined by a large number of vertices and line segments. That is, when the input data designates a smooth circle as the drawing object, the process steps of determining whether the current height cy has gone beyond the height ranges of two reference lines (lines LL and RL in FIG. 11A) and switching the reference line have to be repeated many times. Further, each time the current height cy reaches one end of one of the reference lines, the next reference line connected to the current reference line has to be searched and determined from the other line segments of the figure outline. That is, in the case of drawing a smooth circle or curved figure, the process step of searching for the next reference line (step S0'-11 of FIG. 12) has to be performed on a frequent basis so that the overall process may be slowed down.

Also, when the circle to be actually drawn is small in size, a smaller number of vector data of vectors are generated since the filling data is generated at a predetermined pitch. In this case, the figure outline may include line segments that are not used to generate any vector data. That is, after a new reference line is designated in step S0-11, a positive determination may be made in step S0-5 or S0-6 so that steps S0-7 through S0-9 may not be performed with respect to this new reference line and the process of searching the next reference line may have to be performed once again without obtaining any vector data (horizontal line) from the this new reference line.

In this case, wasteful processes are performed since even figure outline segments from which filling data are not generated (i.e., outline segments that do not intersect with the horizontal lines that make up the filling data) are designated as reference lines in step S0-11.

In one example, in generating the filling data, the figure outline segments may be rearranged beforehand according to their connection order to reduce the processing load. However, in this case, a separate sorting process may have to be performed.

As can be appreciated, simply searching the intersection points between horizontal lines and the figure outline as in the above comparative example may not be suitable for generating filling data for filling certain types of figures.

First Embodiment

In the following, process steps performed by the image processing apparatus 100 to generate filling data according to a first embodiment of the present invention are described. In the present embodiment, line segments of the figure outline are referenced in order, and portions of provisional vector data that intersect with the figure outline are subject to processing. In this way processing efficiency may be improved, for example.

Figure 14:
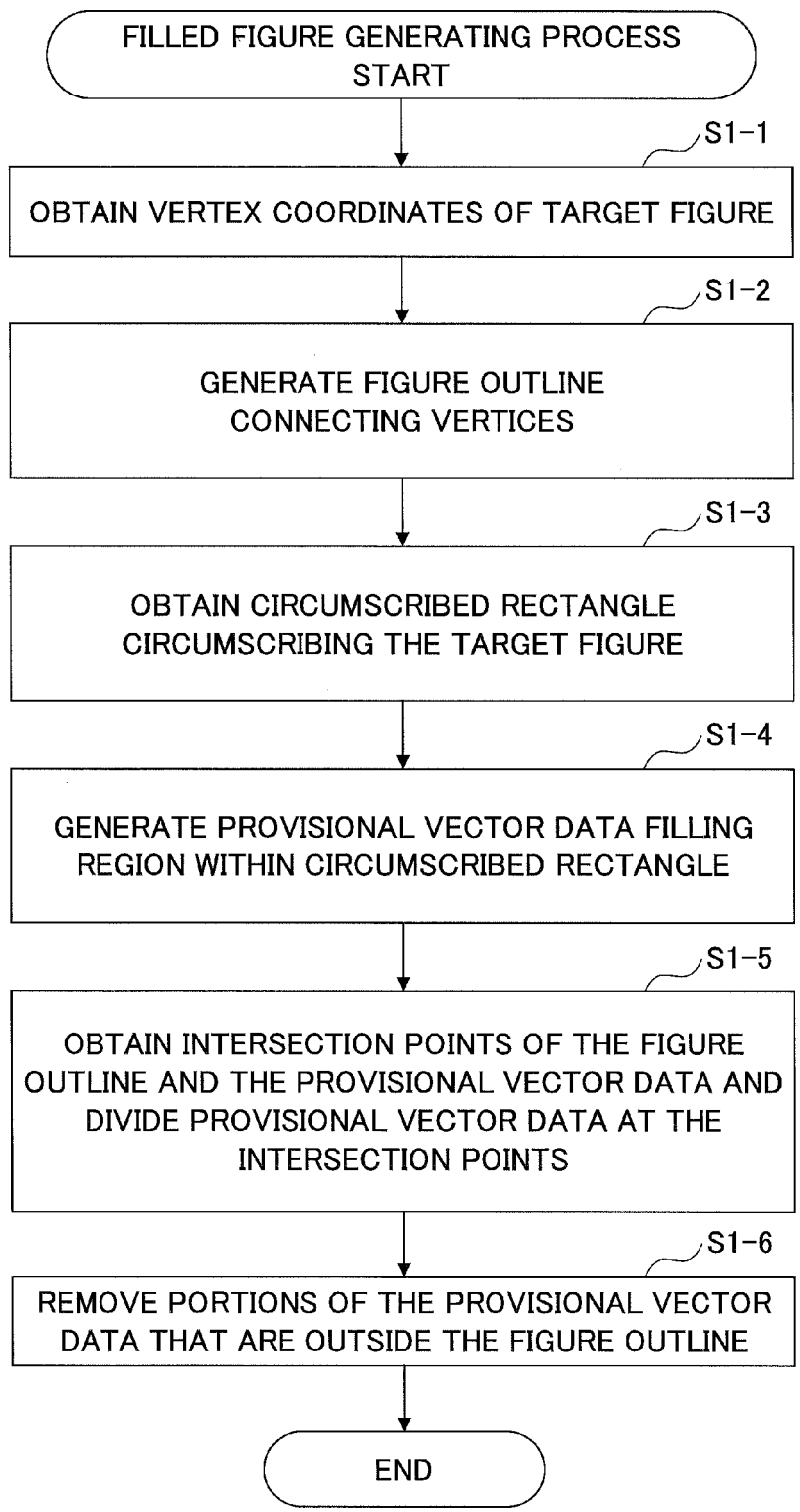
FIG. 14 is a flowchart showing exemplary process steps performed by the image processing apparatus to generate filling data according to a first embodiment of the present invention.
Figure 15A:
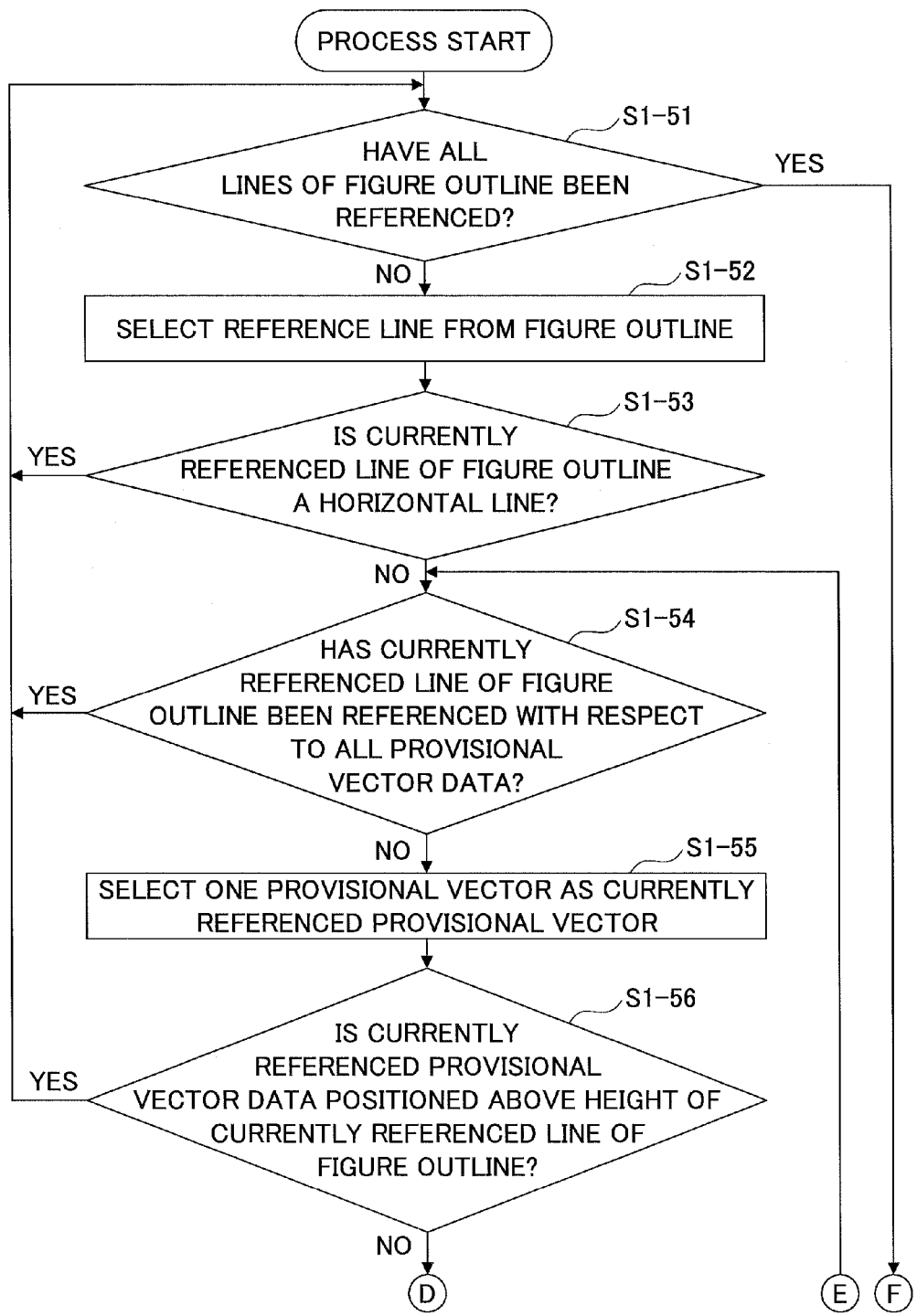
FIGS. 15A-15B are flowcharts showing exemplary detained process steps of a vector division process of FIG. 14.
Figure 15B:
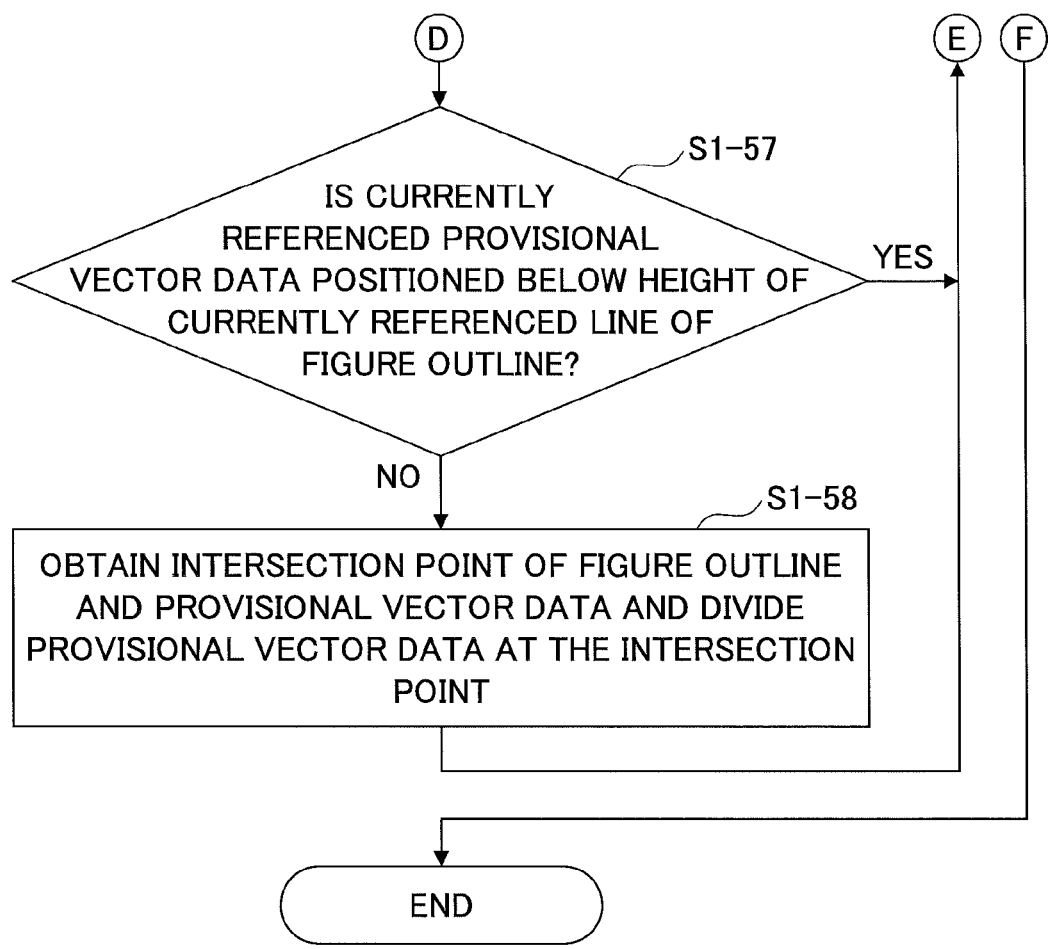

FIGS. 14 and 15A-15B are flowcharts showing exemplary process steps performed by the image processing apparatus 100 to generate filling data according to the first embodiment. FIGS. 16A-16F are diagrams schematically illustrating an exemplary manner of generating filling data according to the present embodiment.

Referring to FIG. 14, in step S1-1, the image processing apparatus 100 obtains vertex coordinate data from the user or a file as input data. For example, coordinate data of the vertices A-E are of the polygon figure shown in FIG. 16A may be input.

In step S1-2, the circumscribed rectangle generating unit 41 generates the line segments making up the outline of the figure corresponding to the drawing object (e.g., lines AE, ED, DC, CB, and BA in FIG. 16B) based on the coordinate data of the vertices obtained in step S1-1. For example, straight lines formed by connecting a first vertex (e.g., A) to other vertices (e.g., B, C, D, E) may be obtained, and pairs of the straight lines may be extracted (e.g., AE and AB, AE and AD, AE and AC) to determine the pair of straight lines forming the greatest angle (AE and AB in FIG. 16B). Then, the first vertex (e.g., A) may be connected to the edge points (e.g., E and B) of the straight lines forming the greatest angle. However, since different shapes may be obtained from the same coordinate data, in another preferred example, the user may input the coordinate data as well as the connection order of the coordinate points. In yet another example, the user may input line segment data (pairs of edge points) as the input data. In this way, the line segments of the figure outline defining an enclosed region are generated.

In step S1-3, the circumscribed rectangle generating unit 41 obtains a circumscribed rectangle that surrounds the figure based on the coordinate data of the vertices obtained in step S1-1. For example, the circumscribed rectangle may be generated as follows. With respect to an x-y coordinate system including the vertices A-E, a vertical line h1 having x-coordinates equal to the maximum x-coordinate value of the vertices A-E, a vertical line having x-coordinates equal to the minimum x-coordinate value of the vertices A-E, a horizontal line v1 having y-coordinates equal to the maximum y-coordinate value of the vertices A-E, and a horizontal line v2 having y-coordinates equal to the minimum y-coordinate value of the vertices A-E are obtained. Then, the y-coordinates of the higher edge points of the vertical lines h1 and h2 are set equal to the maximum y-coordinate value of the vertices A-E, and the y-coordinates of the lower edge points of the vertical lines h1 and h2 are set equal to the minimum y-coordinate value of the vertices A-E. Also, the x-coordinates of the edge points of the horizontal lines v1 and v2 with the greater x-coordinate value is set equal to the maximum x-coordinate value of the vertices A-E, and the x-coordinates of the edge points of the horizontal lines v1 and v2 with the smaller x-coordinate value are set equal to the minimum x-coordinate value of the vertices A-E.

Figure 16A:
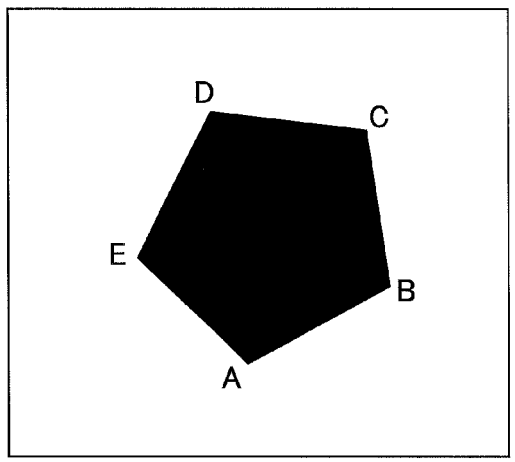
FIGS. 16A-16F are diagrams schematically illustrating an exemplary manner of generating filling data according to the first embodiment.
Figure 16B:
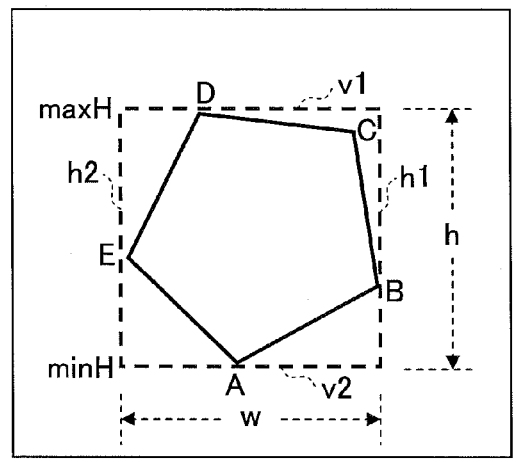
Figure 16C:
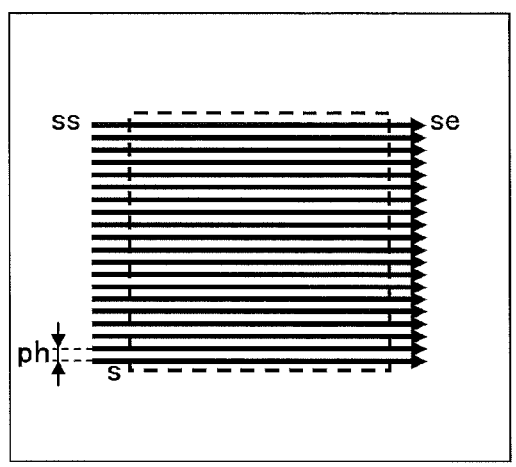

In step S1-4, the provisional vector generating unit 42 generates provisional vector data at predetermined intervals (pitch ph in FIG. 16C) within the height h (see FIG. 16B) of the circumscribed rectangle obtained in step S1-3, starting from the lowest height of the circumscribed rectangle, for example. In this way, provisional vector data of plural provisional vectors may be generated. FIG. 16C shows exemplary provisional vector data generated in step S1-4. It is noted that the predetermined interval (pitch) ph may be arbitrarily determined based on the specifications of the writing control apparatus 20 and the coloration properties of the rewritable paper 14, for example.

Also, the length of the provisional vector data is arranged to exceed the width w (see FIG. 16B) of the circumscribed rectangle. That is, the edge points (e.g., starting point ss and end point se in FIG. 16C) of the provisional vector data are arranged to extend beyond the circumscribed rectangle. It is noted that the extending distance of the provisional vector data from the circumscribed rectangle may be is arranged to extend beyond the circumscribed rectangle in this manner since removal of portions of the divided provisional vector data is performed based on the circumscribed rectangle. Also, although the height of the vector data may be arbitrarily determined, the provisional vector data is preferably generated up to the maximum height maxH (see FIG. 16B) of the circumscribed rectangle generated in step S1-3.

Figure 16D:
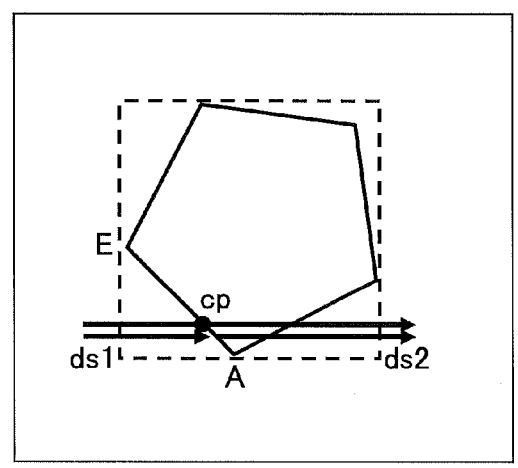

In step S1-5, the intersection calculating unit 43 compares the line segments of the figure outline generated in step S1-2 and the provisional vector data of the provisional vectors generated in step S1-4 on a one-on-one basis to determine the intersection point cp of a given provisional vector and a given line segment of the figure outline. FIG. 16D shows an example of an intersection point cp. It is noted that since a provisional vector of the provisional vector data and a line segment of the figure outline are extracted one at a time in this process step, one intersection point cp is obtained from each comparison of the provisional vector and the line segment.

Then, the vector dividing unit 44 divides the provisional vector at the obtained intersection point cp. That is, one provisional vector is divided into two by the vector dividing unit 44.

FIGS. 15A-15B are flowcharts showing exemplary detailed process steps of the above division process. In this process, each line segment of the figure outline is referenced one by one.

First, the intersection calculating unit 43 determines whether all lines (line segments) of the figure outline have been referenced (S1-51). It is noted that this determination process step is for determining whether the division process has been completed.

If there are one or more lines of the figure outline that have not yet been referenced (S1-51, No), one line of the figure outline that has not yet been referenced is selected (S1-52). It is noted that the order in which the lines of the figure outline are selected may be arbitrary.

After a line of the figure outline to be referenced is selected, the intersection calculating unit 43 determines whether the selected line of the figure outline is a horizontal line (S1-53). If the selected line of the figure outline is a horizontal line (S1-53, Yes), the process goes back to step S1-51 and a next line of the figure outline is selected to be referenced. It is noted that if a line of the figure outline is a horizontal line, it is parallel to the provisional vector. In such case, there would be no need to obtain an intersection point of such a horizontal line with the provisional vector. Provisional vector data coinciding with such a horizontal line of the figure outline may be subsequently divided when the other lines connected to the edge points of the horizontal line are referenced (if the provisional vector data is necessary for generating the filling data). Also, if the provisional vector data is not necessary for generating the filling data, the provisional data may be removed at the stage of removing the provisional vector data outside the figure outline.

If the currently referenced line of the figure outline is not a horizontal line (S1-53, No), the intersection calculating unit 43 determines whether there is a provisional vector that has not been referenced with respect to the currently referenced line of the figure outline (S1-54).

If all the provisional vectors that have been referenced with respect to the currently referenced line of the figure outline (S1-54, Yes), the process goes back to step S1-51 and the next line of the figure outline is selected.

If there are provisional vectors that have not yet been referenced with respect to the currently referenced line of the figure outline (S1-54, No), the intersection calculating unit 43 selects one of the provisional vectors to be subject to a division process (S1-55). In the present example, it is assumed that the provisional vectors are selected in order from bottom to top. However, the provisional vectors may alternatively be selected in order from top to bottom, for example.

Then, after a provisional vector is selected as the currently referenced provisional vector subject to the division process, the intersection calculating unit 43 determines whether the currently referenced provisional vector is positioned higher than the currently referenced line of the figure outline (S1-56). That is, the intersection calculating unit 43 determines whether the currently referenced provisional vector is positioned above both edge points of the currently referenced line of the figure outline.

If the currently referenced provisional vector is positioned above the currently referenced line of the figure outline (S1-56, Yes), this means that no subsequent provisional vectors would be subject to a division process with respect to the currently referenced line of the figure outline. Thus, the process goes back to step S1-51, and the next line of the figure outline is selected.

If the currently referenced provisional vector is not positioned above the currently reference line of the figure outline (S1-56, No), the intersection calculating unit 43 determines whether the currently referenced provisional vector is positioned below the currently referenced line of the figure outline (S1-57). By performing steps S1-56 and S1-57, the process step of obtaining the intersection point cp may be performed only with respect to a provisional vector of the provisional vector data that is within the minimum height and the maximum height of the currently referenced line of the figure outline.

If the currently referenced provisional vector is positioned below the currently referenced line of the figure outline (S1-57, Yes), this means that the currently referenced provisional vector has not yet reached the height of the currently referenced line of the figure outline. In this case, the process goes back to step S1-54. That is, the intersection calculating unit 43 determines whether there is a next provisional vector to be referenced, and if there is, the intersection calculating unit 43 selects the next provisional vector.

It is noted that by performing steps S1-56 and S1-57, provisional vectors that are within the height range of the currently referenced line of the figure outline may be extracted. The intersection calculating unit 43 obtains the intersection point cp of the currently referenced line of the figure outline and the currently referenced provisional vector that is within this height range. Then, the vector dividing unit 44 divides the provisional vectors at the intersection point cp (S1-58).

After dividing the provisional vector, the process goes back to step S1-54, and the above process steps are repeated until all the provisional vectors have been referenced with respect to the currently referenced line of the figure outline.

FIG. 16D illustrates an exemplary case in which the above division process is performed on a provisional vector a first time. That is, the provisional vector shown in FIG. 16D is divided into two provisional vectors ds1 and ds2. It is noted that the distance between the edge point of one provisional vector ds1 and the adjacent edge point of the other provisional vector ds2 may be arbitrarily determined.

In FIG. 16D, of the provisional vectors ds1 and ds2 that are divided by line AE of the figure outline, the provisional vector ds2 may be further divided by line AB of the figure outline. As can be appreciated, in most cases, a provisional vector of the provisional vector data generated in step S1-4 is divided into three divided vectors. A provisional vector that passes through one of the vertices of the figure is divided into two divided vectors.

Figure 16E:
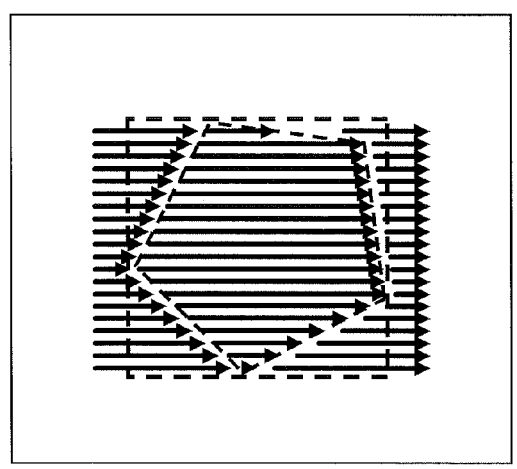

After comparison of all the lines of the figure outline with respect to all the provisional vectors of the provisional vector data is completed, the process of dividing the provisional vector data may be ended. FIG. 16E shows an exemplary result of performing such provisional vector data division process.

Referring back to FIG. 14, in step S1-6, the vector dividing unit 44 removes the divided vectors that include at least one edge point positioned outside the circumscribed rectangle (S1-6). That is, the divided vectors that overlap with the circumscribed rectangle of the figure are removed. It is noted that the divided vectors to be removed may be determined by simply comparing the x-coordinate values of the divided vectors with the x-coordinates of the circumscribed rectangle. In this way, the divided vectors that include at least one edge point outside the circumscribed rectangle may be easily identified and removed.

Figure 16F:
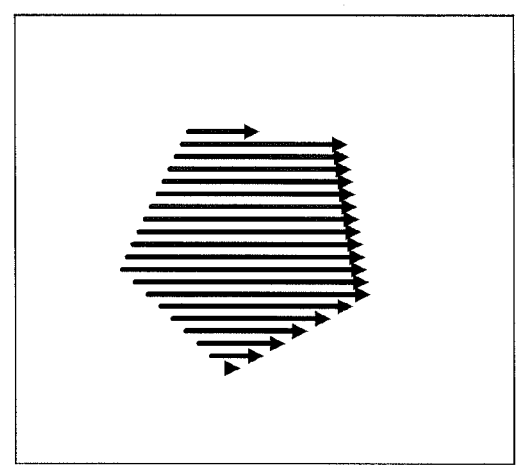

FIG. 16F illustrates an exemplary result of removing the divided vectors of the provisional vectors that overlap with the circumscribed rectangle so that vector data of vectors within the figure remain. That is, the divided vectors of the provisional vector data positioned outside the figure may be removed (deleted), and filling data for filling the internal region of the figure may be generated.

It is noted that in dividing the provisional vector data at the intersection points of the figure outline and the provisional vectors, when adjacent edge points of the divided vectors are arranged to be too far apart, the figure drawn using the vector data may end up being smaller than the figure outline.

Accordingly, in a preferred embodiment, the edge points of the divided vectors may be extended by a predetermined distance so that the edge points coincide with the outline of the designated figure to be drawn. In such case, the extending distance of the edge points may be arbitrarily determined taking into account the specifications of the writing control apparatus 20 and/or the coloration properties of the rewritable paper 14, for example.

Also, in the process of obtaining the intersection points of the figure outline and the provisional vectors illustrated in FIGS. 14 and 15, the provisional vectors are referenced in order from bottom to top. However, in other examples, the provisional vectors may be referenced from top to bottom or from some other direction. In such case, the process steps of comparing the provisional vectors and the lines of the figure outline and dividing the provisional vectors may be adjusted accordingly to maintain overall consistency with the basic principles of the filling data generation process according to the present embodiment.

Further, it is noted that although the filling data is made of vector data of horizontal direction vectors in the above example, in other examples, the filling data may be made of vertical direction vectors or vectors in some other direction.

According to an aspect of the present embodiment, by implementing the process steps as illustrated in FIGS. 14 and 15A-15B, filling data for filing a figure may be generated in a simpler manner by successively referencing the line segments of the figure outline and the provisional vectors of the provisional vector data without having to consider the connecting relationship between the line segments of the figure outline and/or the order in which the line segments of the figure outline should be referenced, for example.

That is, in the present embodiment, the line segments of the figure outline do not have to be referenced according to the manner in which they are connected so that the reference line switching process S0-11 of the comparative example (see FIGS. 11 and 12) does not have to be performed. Accordingly, even when a figure having a large number of vertices such as a circle is designated as the drawing object, a process of searching the next line segment connected to the currently referenced line segment of the figure outline does not have to be repetitively performed. In this way, processing speed and efficiency may be improved, for example.

Second Embodiment

FIGS. 17A-17G are diagrams schematically illustrating an exemplary manner in which the image processing apparatus 100 generates vector data according to a second embodiment of the present invention.

Figure 17A:
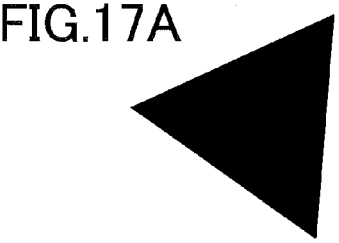
FIGS. 17A-17G are diagrams schematically illustrating an exemplary manner in which the image processing apparatus generates vector data according to a second embodiment of the present invention.
Figure 17E:
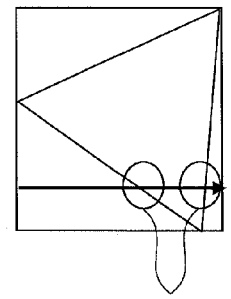
Figure 17B:
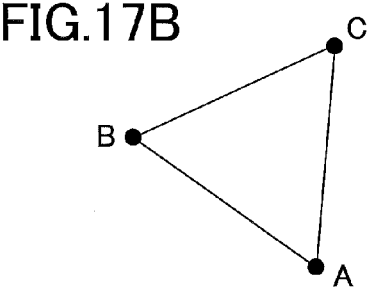

FIG. 17A shows a filled triangle figure corresponding to the desired drawing object. In FIG. 17B, the user inputs coordinate data of the three vertices of the triangle figure to the image processing apparatus 100. In FIG. 17C, the image processing apparatus 100 generates a circumscribed rectangle circumscribing the figure based on the coordinate data. It is noted that the vector data for filling the figure are included within this circumscribed rectangle.

Figure 17F:
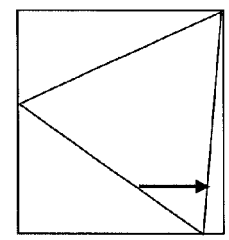
Figure 17C:
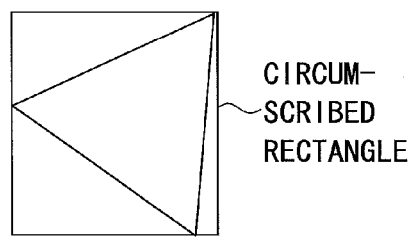
Figure 17G:
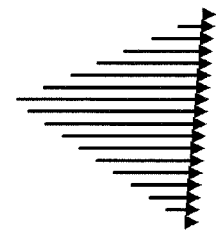
Figure 17D:
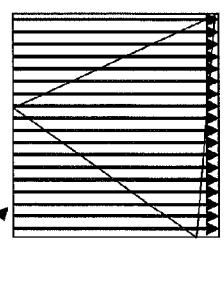

In FIG. 17D, the image processing apparatus 100 generates provisional vector data filling the circumscribed rectangle. In FIG. 17E, the image processing apparatus 100 extracts the provisional vectors of the provisional vector data one by one, and determines their intersection points with the figure outline. It is noted that the portion of the provisional vector data within the triangle figure corresponds to the target vector data to be obtained in the subsequent process steps.

In FIG. 17F, the image processing apparatus 100 shortens a provisional vector that has edge points positioned closer to the circumscribed rectangle than the intersection points of this provisional vector and the figure outline. That is, the image processing apparatus 100 adjusts the edge points of the provisional vector to the intersection points to shorten the provisional vector. In this way, a target vector for filling the figure may be obtained.

FIG. 17G illustrates exemplary filling data for filling the triangle figure that may be generated by performing the above process steps with respect to each provisional vector of the provisional vector data.

According to an aspect of the present embodiment, filling data for filing a figure may be generated in a simpler manner by successively referencing the line segments of the figure outline and the provisional vectors of the provisional vector data without having to consider the connecting relationship between the line segments of the figure outline and/or the order in which the line segments of the figure outline should be referenced so that the processing speed and efficiency may be improved as is described above in connection with the first embodiment.

Further, since the provisional vectors do not have to be divided as in the first embodiment, the filling data may not end up being smaller than the figure outline, and memory resources do not have to be secured for storing the provisional vector data of the provisional vectors divided into three vectors, for example.

[Configuration]

Figure 18:
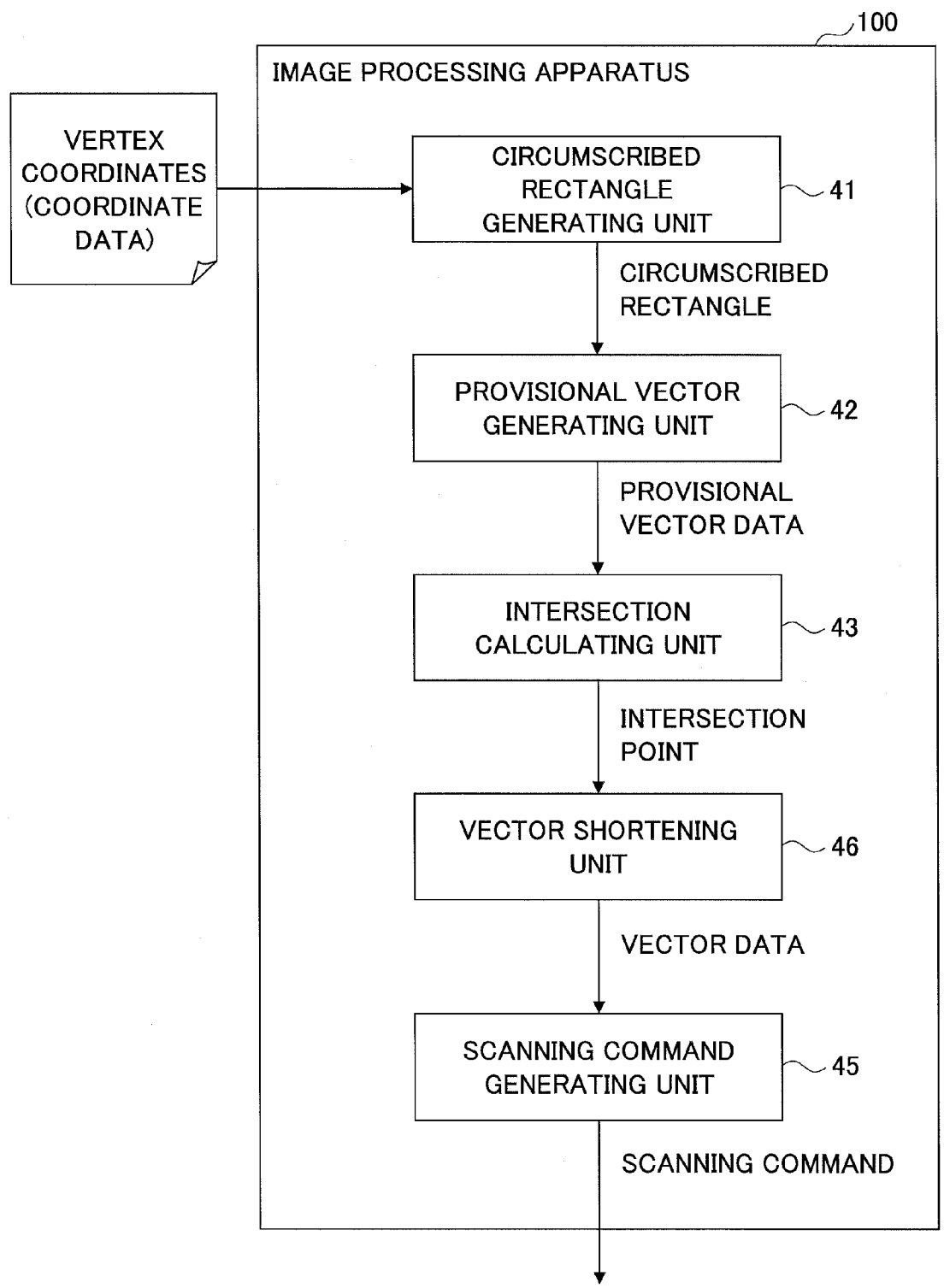
FIG. 18 is a block diagram showing an exemplary functional configuration of the image processing apparatus according to the second embodiment.

FIG. 18 is a block diagram showing an exemplary functional configuration of the image processing apparatus 100 according to the second embodiment. It is noted that the functional features shown in FIG. 18 that may be identical to those of FIG. 10 are given the same reference numerals and their descriptions are omitted.

The image processing apparatus 100 according to the present embodiment includes the circumscribed rectangle generating unit 41, the provisional vector generating unit 42, the intersection calculating unit 43, the vector dividing unit 44, the scanning command generating unit 45, and a vector shortening unit 46. That is, the functional configuration of the image processing apparatus 100 according to the present embodiment differs from the first embodiment in that it includes the vector shortening unit 46.

The vector shortening unit 46 shortens the provisional vector data to be within the figure outline. In this way, the vector shortening unit 46 generates vector data corresponding to filling data for filling the figure.

[Filling Data Generation Process]

Figure 19:
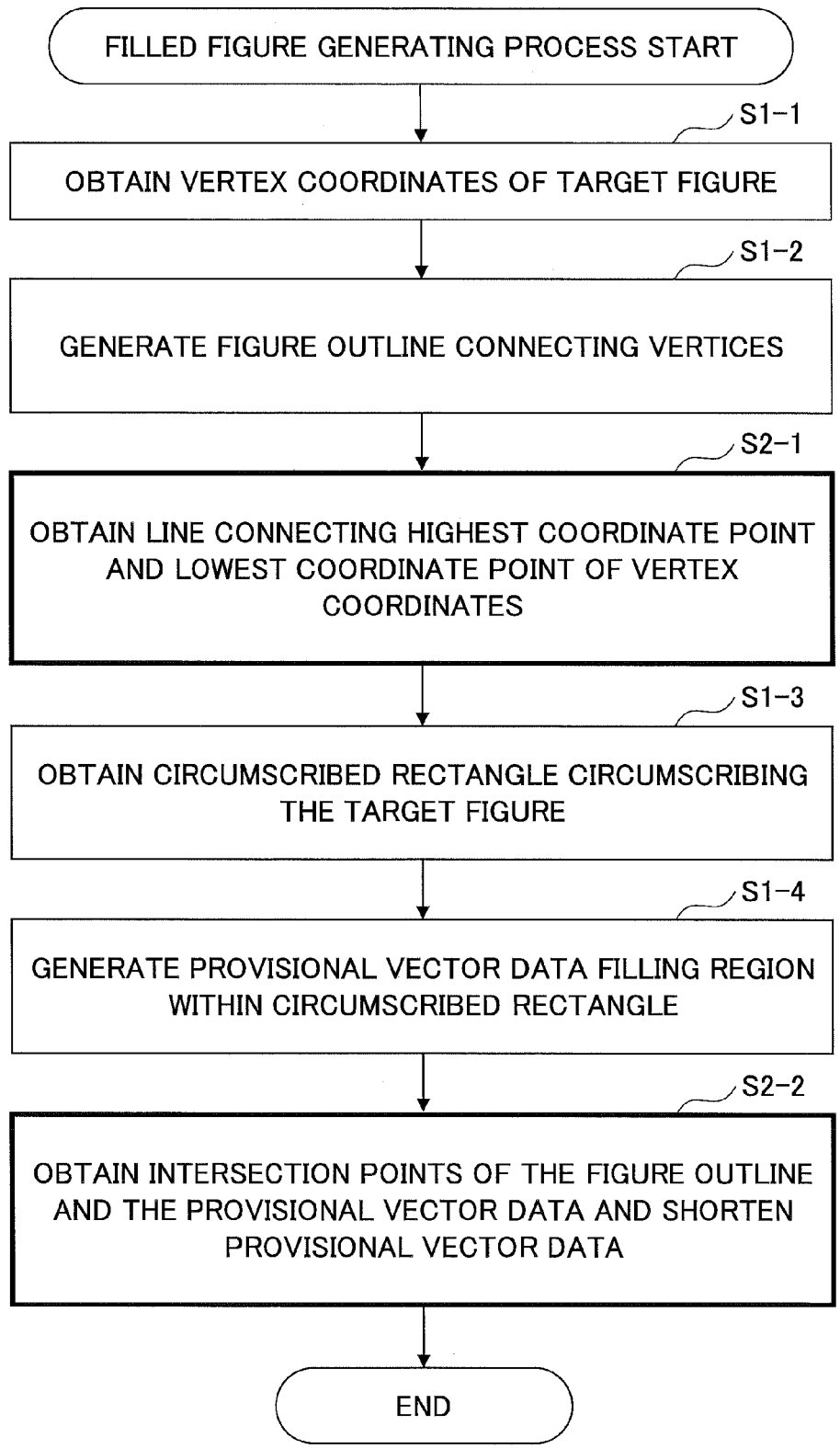
FIG. 19 is a flowchart showing exemplary process steps performed by the image processing apparatus to generate filling data according to the second embodiment.

FIGS. 19 and 20 are flowcharts illustrating exemplary process steps performed by the image processing apparatus 100 to generate filling data according to the present embodiment. FIGS. 21A-21E are diagrams schematically illustrating an exemplary manner of generating filling data according to the present embodiment. It is noted that steps S1-1 through S1-4 of FIG. 19 may be identical to steps S1-1 through S1-4 of FIG. 14. In the present embodiment, step S1-6 of FIG. 14 for removing provisional vector data of provisional vectors outside the figure outline is omitted.

Referring to FIG. 19, in step S1-1, the image processing apparatus 100 obtains vertex coordinate data (e.g., A-E of FIG. 21A) from the user or a file as input data.

In step S1-2, the circumscribed rectangle generating unit 41 generates the line segments making up the outline of the figure corresponding to the drawing object (e.g., lines AE, ED, DC, CB, and BA in FIG. 21A) based on the coordinate data of the vertices obtained in step S1-1. It is noted that the line segments of the figure outline may be obtained in a manner similar to the first embodiment so that descriptions thereof are omitted. Also, in an alternative embodiment, the line segments of the figure outline (e.g., as pairs of edge points) may be obtained as input data in step S1-1 so that the process of generating the line segments may be omitted.

Figure 21A:
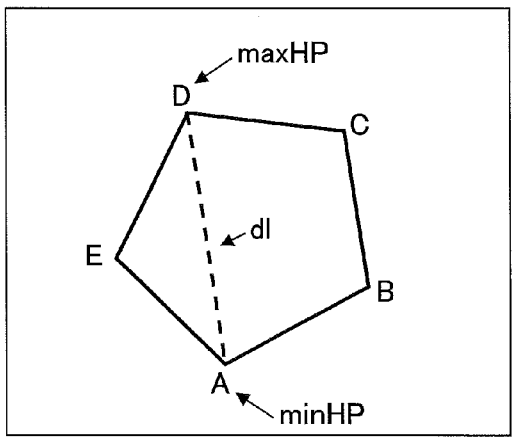
FIGS. 21A-21E are diagrams schematically illustrating an exemplary manner of generating filling data according to the second embodiment.

Then, in step S2-1, the intersection calculating unit 43 selectively extracts the vertex with a y-coordinate at the maximum height maxHP and the vertex with a y-coordinate at the minimum height minHP (outermost points) based on the coordinate data of the vertices obtained in step S1-1, and obtains a straight line dl that connects the extracted vertices maxHP and minHP. FIG. 21A illustrates an example of line dl. It is noted that the vertex minHP with the y-coordinate at the minimum height is on one side a circumscribed rectangle of the figure that faces an opposite side of the circumscribed rectangle including the vertex maxHP with the y-coordinate at the maximum height.

In step S1-3, the circumscribed rectangle generating unit 41 obtains the circumscribed rectangle of the figure based on the coordinate data of the vertices obtained in step S1-1. It is noted that the circumscribed rectangle may be obtained in a manner similar to the first embodiment so that descriptions thereof are omitted.

In step S1-4, the provisional vector generating unit 42 generates provisional vector data at predetermined intervals (pitch) ph within the height of the circumscribed rectangle obtained in step S1-3, starting from the lowest height of the circumscribed rectangle, for example. In this way, provisional vector data of plural provisional vectors may be generated. It is noted that the predetermined interval (pitch) ph may be arbitrarily determined depending on the specifications of the writing control apparatus 20 and the coloration properties of the rewritable paper 14, for example. Also, it is noted that although the edge points of the provisional vector data are arranged to extend outside the circumscribed rectangle in the first embodiment in order to enable removal of the provisional vector data of the provisional vectors outside the figure outline, in the present embodiment, the edge points of the provisional data may be arranged to be accommodated within the circumscribed rectangle.

Figure 21B:
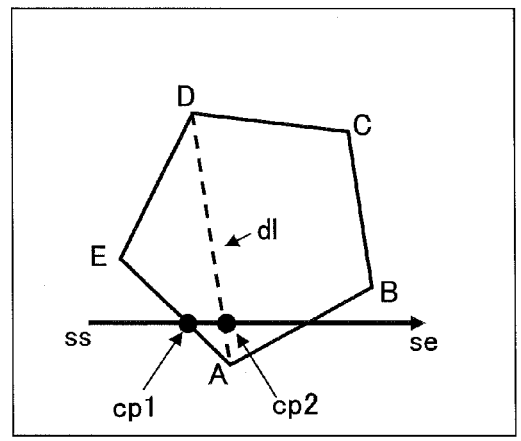

In step S2-2, the intersection calculating unit 43 compares the line segments of the figure outline obtained in step S1-2 and the provisional vectors of the provisional vector data obtained in step S1-4 one by one to obtain the intersection points between the provisional vectors and the line segments. It is noted that intersection point cp1 shown in FIG. 21B is an example of the intersection point obtained in step S2-2. The other intersection point cp2 shown in FIG. 21B is described in detail below. In the present embodiment, the vector shortening unit 46 shortens the provisional vector to the intersection point cp1. That is, in the present embodiment, the provisional vector is simply shortened at the intersection point cp1 rather than being divided up into plural vectors.

Figure 20A:
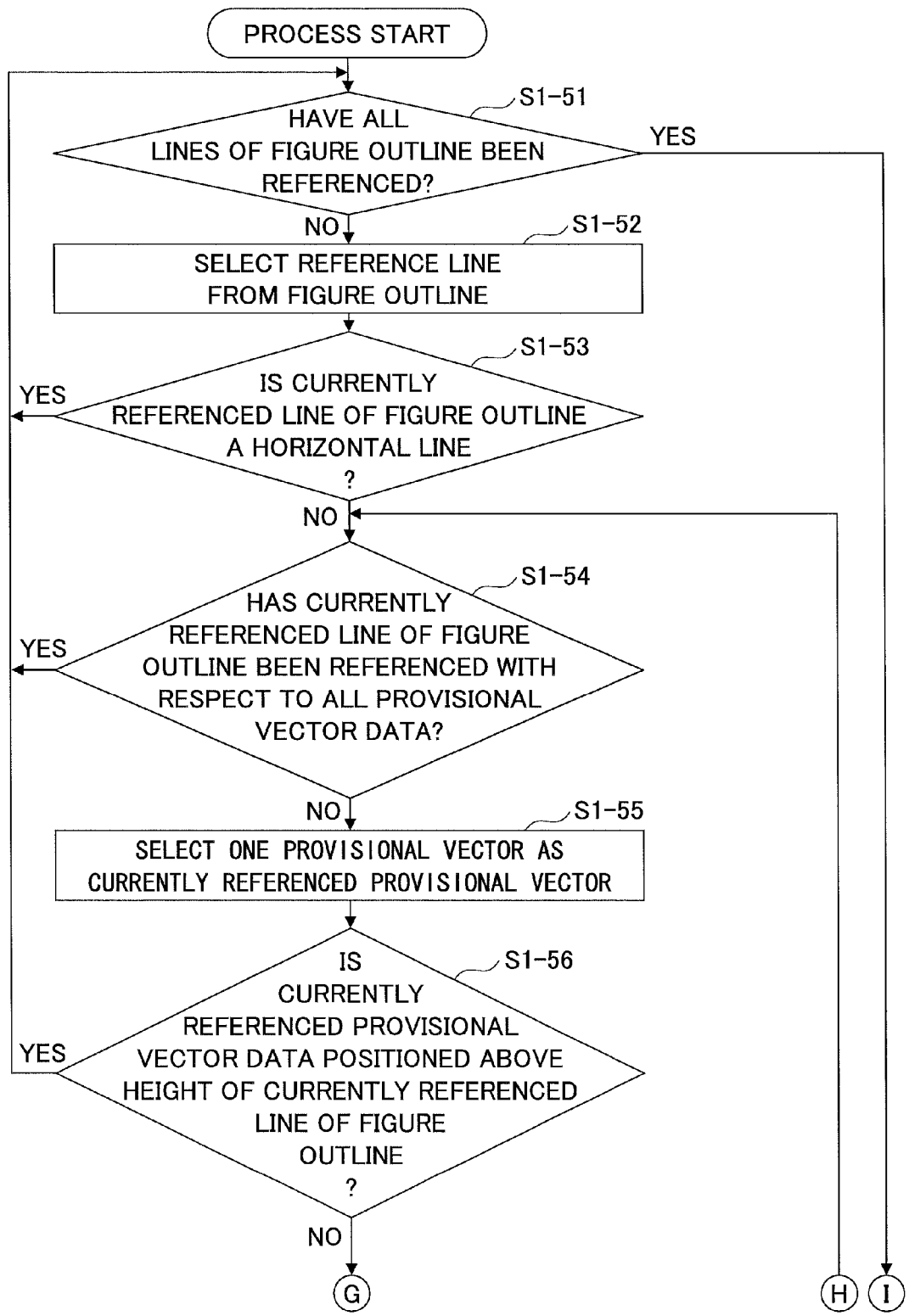

FIGS. 20A-20B are flowcharts illustrating exemplary detailed process steps for shortening the provisional vector data. It is noted that the process steps of FIGS. 20A-20B that may be identical to those shown in FIGS. 15A-15B are given the same reference numerals and their detailed descriptions are omitted. The process steps S1-51 through S1-57 of FIGS. 20A-20B are substantially identical to those of FIG. 15A-15B.

First, the vector shortening unit 46 determines whether all lines (line segments) of the figure outline have been referenced (S1-51). If there are one or more lines of the figure outline that have not yet been referenced (S1-51, No), one line of the figure outline that has not yet been referenced is selected (S1-52).

Then, the vector shortening unit 46 determines whether the selected line of the figure outline is a horizontal line (S1-53). If the currently referenced line of the figure outline is not a horizontal line (S1-53, No), the vector shortening unit 46 determines whether there is a provisional vector that has not been referenced with respect to the currently referenced line of the figure outline (S1-54).

If there are provisional vectors that have not yet been referenced with respect to the currently referenced line of the figure outline (S1-54, No), the vector shortening unit 46 selects one of the provisional vectors as the currently referenced provisional vector (S1-55), and determines whether the currently referenced provisional vector is positioned higher than the currently referenced line of the figure outline (S1-56).

If the currently referenced provisional vector is not positioned above the currently reference line of the figure outline (S1-56, No), the vector shortening unit 46 determines whether the currently referenced provisional vector is positioned below the currently referenced line of the figure outline (S1-57).

By performing the above process steps, provisional vectors that may need to be shortened with respect to the currently referenced line of the figure outline may be selectively extracted.

Next, the intersection calculating unit 43 obtains the intersection point cp1 between the currently referenced line of the figure outline and the currently referenced provisional vector (S2-11).

FIG. 21B shows an example of the intersection point cp1 between line AE of the figure outline and a provisional vector.

After obtaining the intersection point cp1, the intersection calculating unit 43 obtains the intersection point cp2 between the straight line dl obtained in step S2-1 and the currently referenced provisional vector (S2-12). The intersection point cp2 obtained in step S2-12 is used as a reference for determining which edge point of the currently referenced provisional vector is to be shortened.

After calculating the intersection points cp1 and cp2, the vector shortening unit 46 compares the x-coordinate values of the intersection points cp1 and cp2 to determine whether the intersection point cp1 is positioned at the left side of the intersection point cp2 or the right side of the intersection point cp2 (S2-13). For example, in FIG. 21B, the intersection point cp2 is positioned at the left side of the intersection point cp2.

When it is determined that the intersection point cp1 is positioned at the left side of the intersection point cp2, this means that the currently referenced line of the figure outline is on the left side of the figure to be drawn.

With respect to a figure outline segment that is on the left side of the figure, portions of the provisional vector positioned at the left side of this figure outline segment are outside the figure and portions of the provisional vector positioned at the right side of the figure outline are inside the figure. To generate a filled figure, vector data of vectors positioned inside the figure are desired. Accordingly, in the present embodiment, provisional vectors having portions positioned at the outer side with respect to the currently referenced line of the figure outline are shortened to their corresponding intersection points cp1 with the currently referenced line.

Figure 21C:
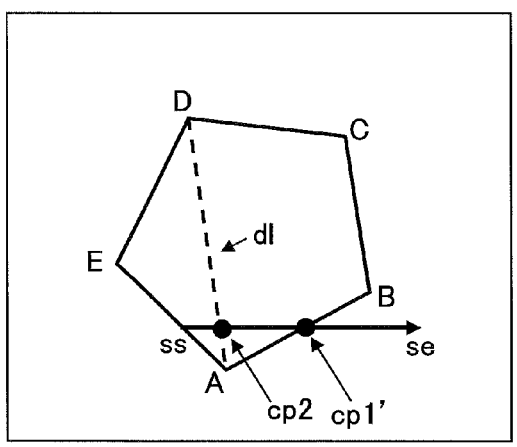

That is, when it is determined in step S2-13 that the intersection point cp1 of the currently referenced provisional vector is positioned at the left side of the intersection point cp2 (S2-13, Yes), the vector shortening unit 46 adjusts the left side edge point of the currently referenced provisional vector to the intersection point cp1 and thereby shortens the currently referenced provisional vector (S2-14). FIG. 21C shows an example in which a provisional vector is shortened by adjusting the left side edge point ss of the provisional vector to the intersection point cp1.

On the other hand, when it is determined in step S2-13 that the intersection point cp1 of the currently referenced provisional vector is positioned at the right side of the intersection point cp2 (S2-13, No), the vector shortening unit 46 adjusts the right side edge point of the currently referenced provisional vector to the intersection point cp1 and thereby shortens the currently referenced provisional vector (S2-15). FIG. 21C shows an intersection point cp1' between line AB and the provisional vector.

Figure 21D:
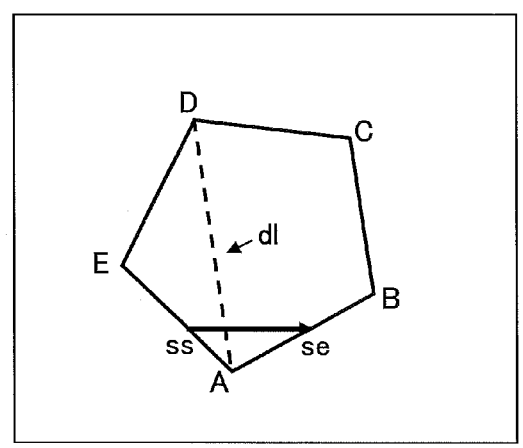
Figure 21E:
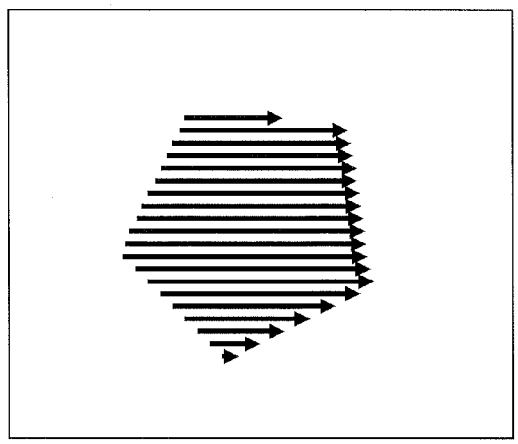

FIG. 21D illustrates an example in which the provisional vector is shortened by adjusting the right side edge point se of the provisional vector to the intersection point cp1'. As for the method of shortening the provisional vector, the coordinate values of the edge point of the provisional vector positioned at the outer side with respect to the currently referenced line of the figure outline may be set equal to the coordinate values of the intersection point cp1, for example.

Also, assuming the vectors of the vector data making up the filling data are all in one direction from the left side to the right side, the starting point ss of the vector is positioned at the left side, and the end point se of the vector is positioned at the right side. In this case, a determination may easily be made as to whether the two edge points (starting point ss and end point se) of the provisional vector are positioned at the left side or right side of the intersection point cp2.

Also, even in a case where the directions of the starting point and the end point of vectors of the vector data making up the filling data are different, whether the edge points of a vector are positioned at the left side or right side of the intersection point cp2 may still be easily determined by comparing the x-coordinate values of the edge points, for example.

After the vector shortening unit 46 shortens the currently referenced provisional vector in step S2-14 or S2-15, the process goes back to step S1-54 to repeat the above process of shortening the provisional vectors with respect to other line segments of the figure outline. In this way, filling data such as that shown in FIG. 21E may be generated.

It is noted that as in the first embodiment, the order in which the provisional vectors are references does not necessarily have to be from the bottom side towards to top side in the present embodiment. For example, the reference order may alternatively be from the top side to the bottom side or from some other direction. Also, the filling data does not necessarily have to be made up of horizontal vectors, but may alternatively include vertical vectors or vectors in some other direction.

According to an aspect of the present embodiment, the image processing apparatus 100 may realize advantages similar to those realized in the first embodiment. Also, by using the straight line dl to determine portions of provisional vectors that are located outside the figure outline, vector data making up the filling data for filling a figure may be generated without dividing up the provisional vectors. In the case of dividing up the provisional vectors into smaller vectors, the amount of provisional vector data (i.e., number of provisional vectors) is temporarily increased as a result of dividing up the provisional vectors. On the other hand, in the present embodiment, the provisional vectors are simply shortened rather than being divided up into smaller vectors so that the amount of provisional vector data is not increased. Thus, system resources such as memory may be conserved and processing speed and efficiency may be further improved, for example.

Third Embodiment

In the following, a third embodiment of the present invention is described. It is noted that in the second embodiment, the filling data is generated by shortening the provisional vectors of the provisional vector data. However, there may be cases where filling data cannot be properly generated using the second embodiment.

FIGS. 22A-22D are diagrams illustrating examples of figures for which filling data may not be properly generated using the second embodiment. In each of the polygon figures P1-P4 shown in FIGS. 22A-22D, the straight line dl connecting the highest coordinate point and the lowest coordinate point of the vertices of the corresponding figure coincides with one or more of the line segments of the figure outline. In FIGS. 22A-22D, lines 11-14 represent line segments of the figure outline that also correspond to the straight line dl connecting the highest coordinate point and the lowest coordinate point of the vertices of the corresponding figures.

In the case of generating filling data for such figures, the provisional vector data may not be properly shortened by merely performing step S2-13 of FIG. 20B. For example, the intersection point cp1 and the intersection point cp2 may be the same so that the two intersection points may not be compared and used to determine their positional relationship. Accordingly, the present embodiment makes certain process accommodations for generating the filling data for figures such as the polygon figures P1-P4.

It is noted that the functional configuration of the image processing apparatus 100 that is adapted to perform processing operations according to the present embodiment may be identical to that shown in FIG. 18.

FIGS. 23A-23B and 24A-24B are flowcharts showing exemplary process steps performed by the image processing apparatus 100 for generating filling data according to the present embodiment.

Figure 23A:
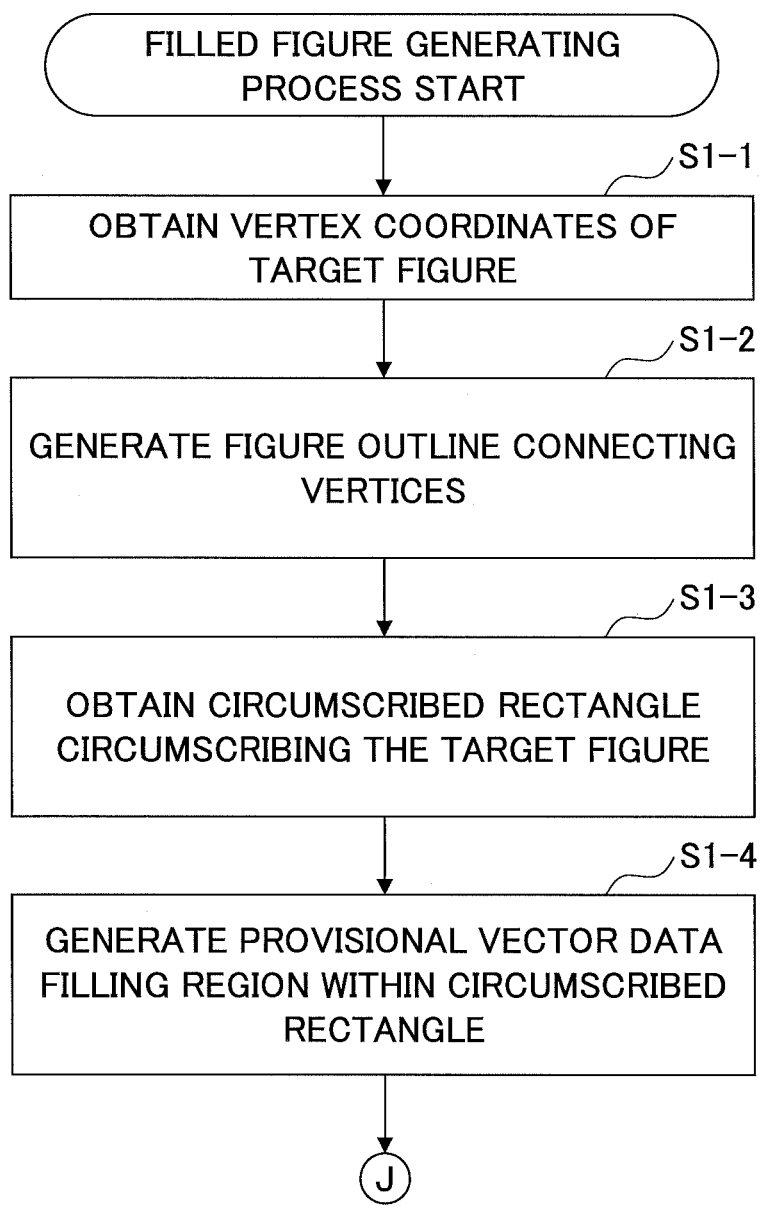
FIGS. 23A-23B are flowcharts showing exemplary process steps performed by the image processing apparatus for generating filling data according to a third embodiment of the present invention.

It is noted that steps S1-2 through S1-4 of FIG. 23A may be identical to those of FIG. 19 so that their descriptions are omitted.

After step S1-4, the vector shortening unit 46 determines whether the straight line dl generated in step S2-1 (i.e., line connecting the highest coordinate point and the lowest coordinate point of the vertices) matches one of the line segments of the figure outline (S3-1). It is noted that this process step is for detecting cases where the line dl of the target figure corresponds to one of the line segments of the figure outline such as lines 11-14 shown in FIGS. 22A-22D.

If the line dl generated in step S2-1 does not coincide with any of the line segments of the figure outline (S3-1, No), the process steps according to the second embodiment may be performed (S2-2).

It is noted that although the determination step S3-1 is performed after step S1-4 in the above example, the determination step S3-1 may be performed at other timings as well. Also, in a case where the preset embodiment is implemented without consideration of the second embodiment, the determination step S3-1 may be omitted as well.

If the line dl generated in step S2-1 matches one of the line segments of the figure outline (S3-1, Yes), the vector shortening unit 46 determines whether the figure includes a vertex that has an x-coordinate value that is greater than the x-coordinate values of the edge points of the line dl generated in step S2-1 (i.e., the coordinate point with the highest y-coordinate value and the coordinate point with the lowest y-coordinate value of the vertex coordinates obtained in step S1-1) (S3-2). For example, in the polygon figure P1 of FIG. 22A, vertices a and b correspond to the coordinate point with the highest y-coordinate value and the coordinate point with the lowest y-coordinate value, and vertices c and d correspond to coordinate points having x-coordinate values that are greater than the x-coordinate values of the vertices a and b.

It is noted that when the line dl generated in step S2-1 corresponds to a side (line segment) of the figure outline with the greater x-coordinates (e.g., line 12 of polygon figure P2 in FIG. 22B), the filling data may be generated using the process steps of the second embodiment. On the other hand, filling data for filling figures such as the polygon figure P1 shown in FIG. 22A may not be properly generated using the process steps of the second embodiment.

Figure 22A:
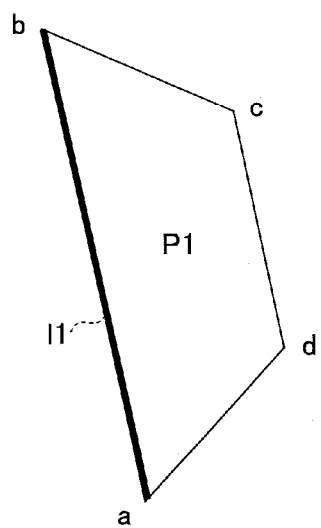
FIGS. 22A-22D are diagrams illustrating examples of figures for which filling data may not be properly generated by implementing the second embodiment.
Figure 22B:
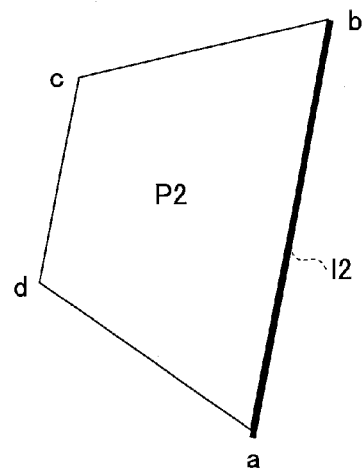

Accordingly, if the figure to be drawn does not include a vertex having an x-coordinate value that is greater than the x-coordinate values of the edge points of the line dl (S3-2, No), this means that filling data for the figure may be generated using the process steps of the second embodiment as is the case with the polygon figure P2 of FIG. 22B. Thus, the process proceeds to step S2-2 in this case.

On the other hand, if the figure to be drawn includes a vertex having an x-coordinate value that is greater than the x-coordinate values of the edge points of the line dl (S3-2, Yes), the intersection calculating unit 43 obtains the intersection points between the line segments of the figure outline and the provisional vectors of the provisional vector data, and the vector shortening unit 46 shortens the provisional vectors to their respective intersection points in a manner that differs from the second embodiment (S3-3).

FIGS. 24A-24B are flowcharts showing exemplary detailed process steps of step S3-3. It is noted that the process steps of FIGS. 24A-24B that are identical to those of FIGS. 20A-20B are given the same reference numerals and their descriptions are omitted. In the present embodiment, step S2-13 of the second embodiment is replaced by step S3-11 of FIG. 24B.

It is noted that step S2-13 of the second embodiment and step S3-11 of the present embodiment are for determining which edge point of the two edge points of the provisional vector is to be adjusted to shorten the provisional vector.

In step S3-11 of the present embodiment, the vector shortening unit 46 compares the x-coordinate values of the intersection point cp1 obtained in step S2-11 and the intersection point cp2 obtained in step S2-12 and determines whether the x-coordinate value of the intersection point cp1 is less than or equal to the x-coordinate value of the intersection point cp2 (S3-11).

If the x-coordinate value of the intersection point cp1 is less than or equal to the x-coordinate value of the intersection point cp2 (S3-11, Yes), the edge point of the provisional vector with the smaller x-coordinate value is adjusted to the intersection point cp1 to shorten the provisional vector (S2-14). For example, in the case where line ab of the polygon figure P1 shown in FIG. 22A corresponds to the currently referenced line of the figure outline, the intersection point cp1 is equal to the intersection point cp2 so that a positive determination is made in step S3-11. In turn, the edge point of the provisional vector with the smaller x-coordinate value may be adjusted to the intersection point cp1 to shorten the provisional vector in step S2-14.

If the x-coordinate value of the intersection point cp1 is not less than or equal to the x-coordinate value of the intersection point cp2 (S3-11, No), the edge point of the provisional vector with the greater x-coordinate value is adjusted to the intersection point cp1 to shorten the provisional vector (S2-15). For example, in the case where line ad of the polygon figure P1 shown in FIG. 22A corresponds to the currently referenced line of the figure outline, the x-coordinate value of the intersection point cp1 is greater than the x-coordinate value of the intersection point cp2 so that a negative determination is made in step S3-11. In turn, the edge point of the provisional vector with the greater x-coordinate value may be adjusted to the intersection point cp1 to shorten the provisional vector in step S2-15.

After completing step S2-14 or S2-15, the image processing apparatus 100 goes back to step S1-54 to perform similar process steps with respect to the remaining provisional vectors of the provisional vector data and the remaining line segments of the figure outline to generate the filling data for the target figure.

Figure 22C:
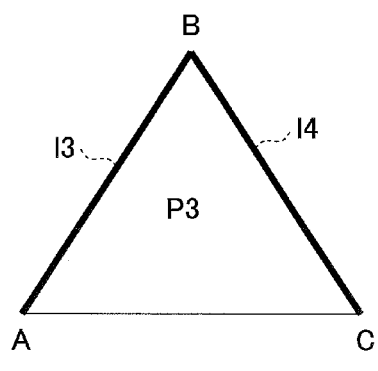
Figure 22D:
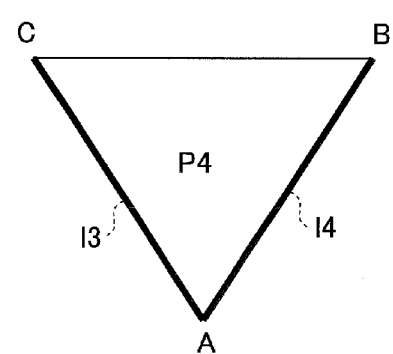

It is noted that the polygon figure P3 shown in FIG. 22C includes two vertices (i.e., A and C) corresponding to coordinate points having the lowest y-coordinate value. In this case, either one of the lowest coordinate points may be used to generate the line dl for performing the process steps according to the present embodiment. Also, the polygon figure P4 shown in FIG. 22D includes two vertices (i.e., A and C) corresponding to coordinate points having the highest y-coordinate value. Similarly, in this case, either one of the highest coordinate points may be used to generate the line dl for performing the process steps according to the present embodiment.

Figure 23B:
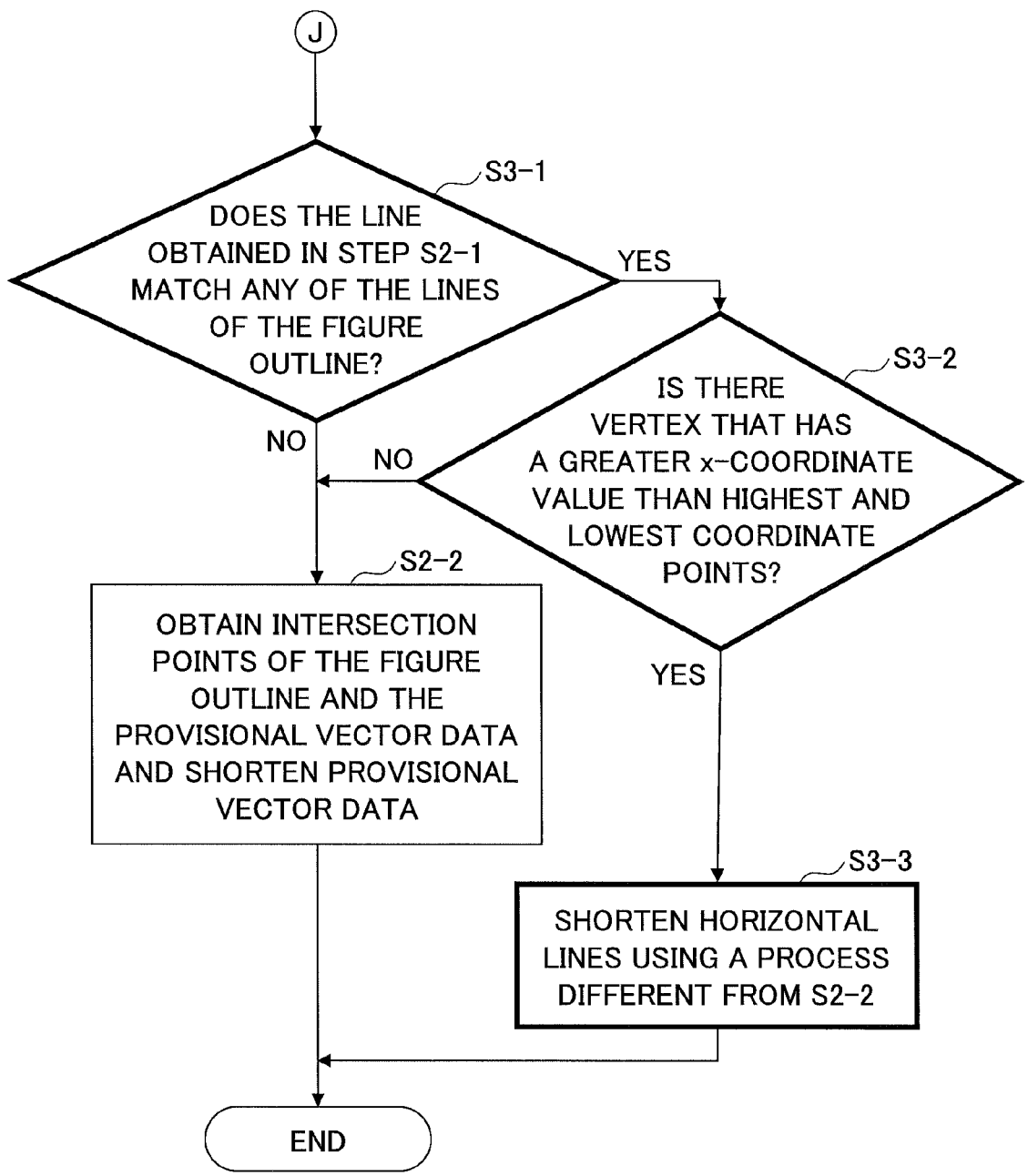

It is noted that when the determination step S2-13 of FIG. 20B involves determining whether the x-coordinate value of the intersection point cp1 is "less than" the x-coordinate value of the intersection point cp2, the generation of filling data for figures such as the polygon figure P1 shown in FIG. 22A may have to be accommodated by the present embodiment. However, in certain modified embodiments, the determination step S2-13 of FIG. 20B may involve determining whether the x-coordinate value of the intersection point cp1 is "greater than" the x-coordinate value of the intersection point cp2. In this case, the generation of filling data for figures such as the polygon figure P1 shown in FIG. 22A may not have to be accommodated by the present embodiment, but the generation of filling data for figures such as the polygon figure P2 shown in FIG. 22B may have to be accommodated by the present embodiment. Also, in this case, step S2-14 of FIG. 20B involves shortening the edge point of the provisional vector with "the greater x-coordinate value," and step S2-15 of FIG. 20B involves shortening the edge point of the provisional data with "the smaller x-coordinate value." Further, in this case, the Yes/No of the determination step S3-2 of FIG. 23B are reversed, and the determination step S3-11 of FIG.

24B involves determining whether the x-coordinate value of the intersection point cp1 is "greater than or equal to" the x-coordinate value of the intersection point cp2 rather than "less than or equal to" the x-coordinate value of the intersection point cp2.

According to an aspect of the present embodiment, accommodations may be made for generating filling data for certain figures such as the polygon figures P1-P4 shown in FIGS. 22A-22D so that filling data may be properly generated for these figures.

Further, the present invention is not limited to these embodiments, and numerous variations and modifications may be made without departing from the scope of the present invention.

For example, the order of the process steps described above may be switched, and/or one or more process step may be added, modified, or omitted within the scope of the present invention. Also, various design modifications may be made within the scope of the present invention such as switching a reference used in a certain determination step from the x-coordinate value to the y-coordinate value, arranging the direction of the vectors of the vector data making up the filling data to be vertical or diagonal rather than horizontal, or arranging line data or some other type of data provided as the input data rather than coordinate data, for example. It is to be understood that the above descriptions of certain embodiments and the accompanying drawings are exemplary and explanatory and not restrictive of the invention as claimed.

The present application is based on and claims the benefit of the priority of Japanese Patent Application No. 2012-007488 filed on Jan. 17, 2012, and Japanese Patent Application No. 2012-255472 filed on Nov. 21, 2012, the entire contents of which are hereby incorporated by reference.

What is claimed is:

1. An information processing apparatus that supplies positional information relating to an energy transmitting position to an apparatus that forms visual information on a medium by transmitting energy on the medium while changing the energy transmitting position, the information processing apparatus comprising:
   a shape information obtaining unit that obtains shape information of a region to be filled;
   a circumscribed rectangle generating unit that generates a circumscribed rectangle around the region;
   a parallel vector data generating unit that generates parallel vector data corresponding to parallel vectors extending across the circumscribed rectangle at a predetermined pitch, the parallel vectors extending from at least one edge of the circumscribed rectangle to another edge of the circumscribed rectangle;
   an intersection calculating unit that calculates a first intersection point between a parallel vector of the parallel vectors and a line segment of an outline defining the region that is generated based on the shape information; and
   at least one of a first data generating unit and a second data generating unit; wherein
   the first data generating unit generates target vector data for filling the region, the target vector data generated by dividing the parallel vector at the first intersection point and removing a portion of the divided line of the parallel vector that overlaps with the circumscribed rectangle; and
   the second data generating unit generates the target vector data by shortening the parallel vector by adjusting an edge point of the parallel vector to the first intersection point.

2. The information processing apparatus as claimed in claim 1, wherein
   the parallel vectors generated by the parallel vector generating unit extend from outside one edge of the circumscribed rectangle to outside another edge of the circumscribed rectangle; and
   the first data generating unit generates the target vector data by removing the divided line of the parallel vector that includes an edge point positioned outside the circumscribed rectangle.

3. The information processing apparatus as claimed in claim 1, wherein
   the intersection calculating unit extracts a first outermost point of the region that is located on a first side edge of the circumscribed rectangle and a second outermost point of the region that located on a second side edge of the circumscribed rectangle facing opposite the first side edge of the circumscribed rectangle, and determines a second intersection point between the parallel vector and a line connecting the first outermost point and the second outermost point; and
   the second data generating unit compares a coordinate value of the first intersection point and a coordinate value of the second intersection point, and determines a shortening direction of the parallel vector.

4. The information processing apparatus as claimed in claim 1, wherein
   when the region is arranged on a first quadrant of an x-y plane,
   the intersection calculating unit extracts a first outermost point of the region with respect to a height direction that is located on a first side edge of the circumscribed rectangle and a second outermost point of the region with respect to the height direction that is located on a second side edge of the circumscribed rectangle facing opposite the first side edge of the circumscribed rectangle, and determines whether the region includes a vertex point having a greater x-coordinate value than the first outermost point and the second outermost point;
   when the region does not include the vertex point having the greater x-coordinate value,
   the intersection calculating unit determines a second intersection point between the parallel vector and a line connecting the first outermost point and the second outermost point; and
   the second data generating unit compares the first intersection point and the second intersection point to determine whether an x-coordinate value of the first intersection point is less than an x-coordinate value of the second intersection point, shortens the parallel vector by adjusting an edge point of the parallel vector with a smaller x-coordinate value to the first intersection point if the x-coordinate value of the first intersection point is less than the x-coordinate value of the second intersection point, and shortens the parallel vector by adjusting an edge point of the parallel vector with a greater x-coordinate value to the first intersection point if the x-coordinate value of the first intersection point is greater than or equal to the x-coordinate value of the second intersection point;
   when the region includes the vertex point having the greater x-coordinate value,
   the intersection calculating unit determines the second intersection point between the parallel vector and the line connecting the first outermost point and the second outermost point; and the second data generating unit compares the first intersection point and the second intersection point to determine whether the x-coordinate value of the first intersection point is less than or equal to the x-coordinate value of the second intersection point, shortens the parallel vector by adjusting the edge point of the parallel vector with the smaller x-coordinate value to the first intersection point if the x-coordinate value of the first intersection point is less than or equal to the x-coordinate value of the second intersection point, and shortens the parallel vector by adjusting the edge point of the parallel vector with the greater x-coordinate value to the first intersection point if the x-coordinate value of the first intersection point is greater than the x-coordinate value of the second intersection point.

5. The information processing apparatus as claimed in claim 4, wherein
the intersection calculating unit determines whether the region includes the vertex point having a greater x-coordinate value than the first outermost point and the second outermost point when the line connecting the first outermost point and the second outermost point corresponds to the line segment of the outline of the region.

6. The information processing apparatus as claimed in claim 1, wherein
the intersection calculating unit extracts the line segments of the outline of the region one by one, and obtains the first intersection point between the extracted line segment and the parallel vector that is positioned within a minimum height of the extracted line segment and a maximum height of the extracted line segment.

7. The information processing apparatus as claimed in claim 1, further comprising:
a control unit that controls an energy irradiating apparatus based on the control data, wherein the predetermined pitch is determined based on at least one of instructions of the control unit and a color of thermal paper.

8. An information processing method of an information processing apparatus that supplies positional information relating to an energy transmitting position to an apparatus that forms visual information on a medium by transmitting energy on the medium while changing the energy transmitting position, the method comprising:
a shape information obtaining step of obtaining shape information of a region to be filled;
a circumscribed rectangle generating step of generating a circumscribed rectangle around the region;
a parallel vector data generating step of generating parallel vector data corresponding to parallel vectors extending across the circumscribed rectangle at a predetermined pitch, the parallel vectors extending from at least one edge of the circumscribed rectangle to another edge of the circumscribed rectangle;
an intersection calculating step of calculating a first intersection point between a parallel vector of the parallel vectors and a line segment of an outline defining the region that is generated based on the shape information; and
at least one of a first data generating step and a second data generating step; wherein
the first data generating step includes generating target vector data for filling the region, the target vector data generated by dividing the parallel vector at the first intersection point and removing a divided line of the parallel vector that overlaps with the circumscribed rectangle; and
the second data generating step includes generating the target vector data by shortening the parallel vector through adjusting an edge point of the parallel vector to the first intersection point.

9. The information processing method of claim 8, wherein the predetermined pitch is determined based on specifications of a writing control apparatus and/or coloration properties of thermal paper.

10. A system for forming visual information on a medium by transmitting energy on the medium while changing a transmitting position of the energy, the system comprising:
a shape information obtaining unit that obtains shape information of a region to be filled;
a circumscribed rectangle generating unit that generates a circumscribed rectangle the region;
a parallel vector data generating unit that generates parallel vector data corresponding to parallel vectors extending across the circumscribed rectangle at a predetermined pitch, the parallel vectors extending from at least one edge of the circumscribed rectangle to another edge of the circumscribed rectangle;
an intersection calculating unit that calculates a first intersection point between a parallel vector of the parallel vectors and a line segment of an outline defining the region that is generated based on the shape information;
at least one of a first data generating unit and a second data generating unit; wherein
the first data generating unit generates target vector data for filling the region, the target vector data being generated by dividing the parallel vector at the first intersection point and removing a divided line of the parallel vector that overlaps with the circumscribed rectangle;
the second data generating unit generates the parallel line data by shortening the parallel line by adjusting an edge point of the parallel line to the first intersection point;
a control data generating unit that generates control data including an energy transmitting start position and an energy transmitting end position based on the generated vector data; and
a control unit that controls an energy irradiating apparatus based on the control data.

11. The system for forming visual information on a medium of claim 10, wherein the predetermined pitch is determined based on specifications of a writing control apparatus and/or coloration properties of thermal paper.

* * * * *